United States Patent [19]

Toda et al.

[11] Patent Number: 5,570,338
[45] Date of Patent: Oct. 29, 1996

[54] OPTICAL INFORMATION RECORDING MEDIUM WHICH USES DIFFRACTION GRATING

[75] Inventors: Toshiki Toda, Satte; Susumu Takahashi, Matsudo; Fujio Iwata, Chiba, all of Japan

[73] Assignee: Toppan Printing Co., Ltd., Tokyo, Japan

[21] Appl. No.: 232,072

[22] PCT Filed: Aug. 26, 1993

[86] PCT No.: PCT/JP93/01199

§ 371 Date: Apr. 28, 1994

§ 102(e) Date: Apr. 28, 1994

[87] PCT Pub. No.: WO94/06113

PCT Pub. Date: Mar. 17, 1994

[30] Foreign Application Priority Data

Aug. 28, 1992 [JP] Japan .................................. 4-230535

[51] Int. Cl.$^6$ .................................. G11B 7/24; G11B 7/00
[52] U.S. Cl. .................................. 369/275.1; 369/109
[58] Field of Search .................................. 369/275.1, 275.3, 369/15, 103, 44.37, 44.32, 44.38, 109, 275.4, 110

[56] References Cited

U.S. PATENT DOCUMENTS

| | | | |
|---|---|---|---|
| 4,847,478 | 7/1989 | Sugiura | 369/275.1 |
| 5,007,690 | 4/1991 | Chern et al. | 359/11 |
| 5,331,626 | 7/1994 | Sugiura | 369/275.1 |
| 5,337,301 | 8/1994 | Sugiura et al. | 369/110 |
| 5,359,591 | 10/1994 | Nomoto | 369/275.1 |
| 5,400,313 | 3/1995 | Belser et al. | 369/275.1 |

FOREIGN PATENT DOCUMENTS

| | | |
|---|---|---|
| 0552887 | 7/1993 | European Pat. Off. . |
| 57-141032 | 9/1982 | Japan . |
| 61-134946 | 6/1986 | Japan . |
| 4-16684 | 2/1992 | Japan . |
| 5-144079 | 6/1993 | Japan . |

OTHER PUBLICATIONS

*Patent Abstracts of Japan*, vol. 17, No. 358, (M–1440), Jul. 7, 1993.

Primary Examiner—Tan Dinh
Attorney, Agent, or Firm—Burns, Doane, Swecker & Mathis, LLP

[57] ABSTRACT

In an optical information recording medium of this invention, at least one cell including diffraction gratings is disposed on a planar substrate. This cell is divided into n (n is an integer of 2 or more) regions such that each divided region represents one binary data. To read information, light-receiving elements corresponding in number of the number n of divided regions of the cell are disposed to correspond to the respective divided regions. One incident light beam is caused to be incident on the cell. Diffracted light components emerging from the respective divided regions of the cell are received by the light-receiving elements, thereby reproducing data. Thus, information can be recorded at a very high density, and information can be read at a high speed.

18 Claims, 13 Drawing Sheets

REGION DIVISION IN ONE DIRECTION

REGION DIVISION IN TWO DIRECTIONS

REGION DIVISION IN CIRCUMFERENTIAL DIRECTION (GRATING INTERVAL IS CONSTANT)

REGION DIVISION IN CIRCUMFERENTIAL DIRECTION (GRATING INTERVAL IS VARIED)

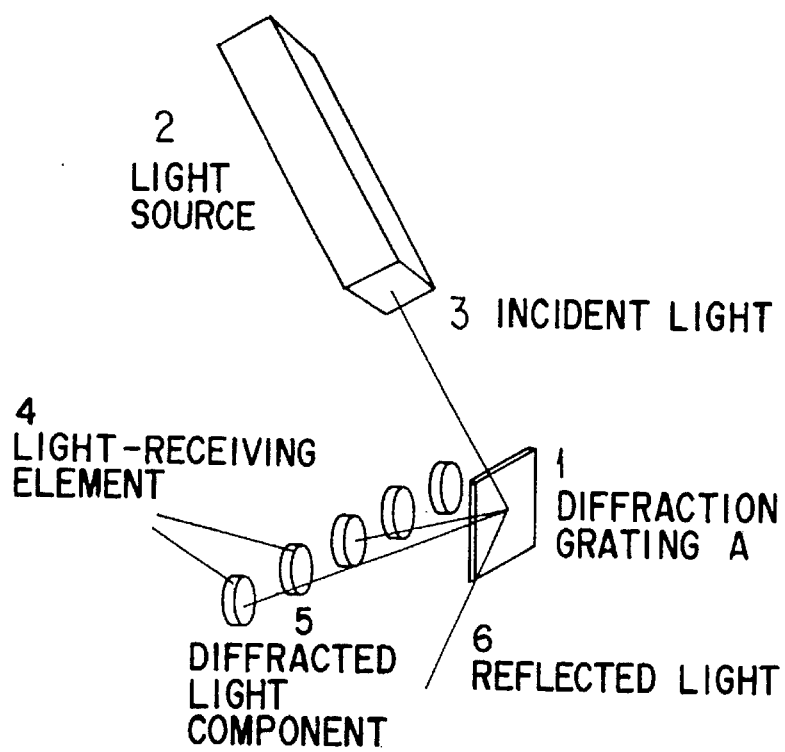
F I G. 2
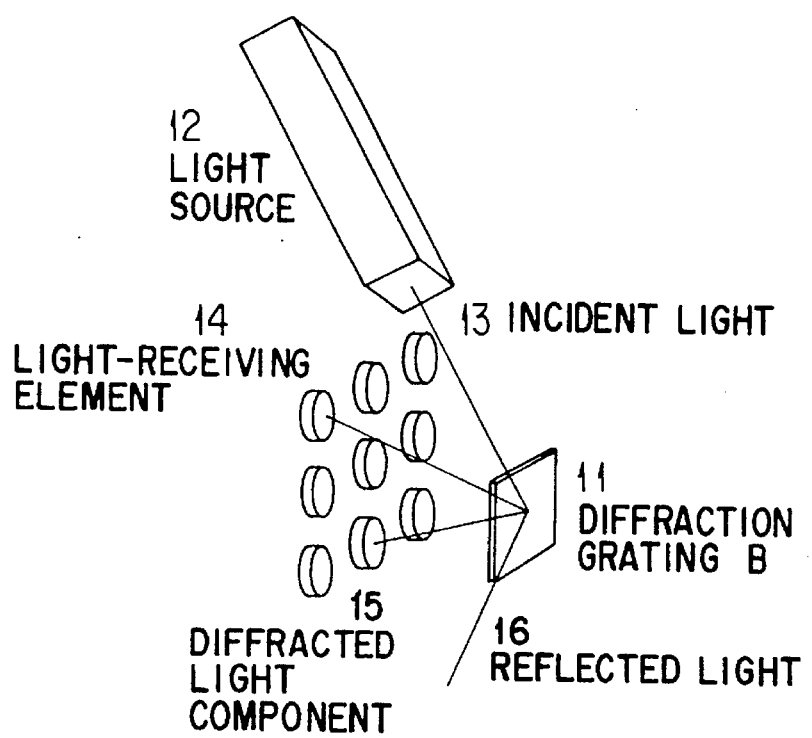
F I G. 3

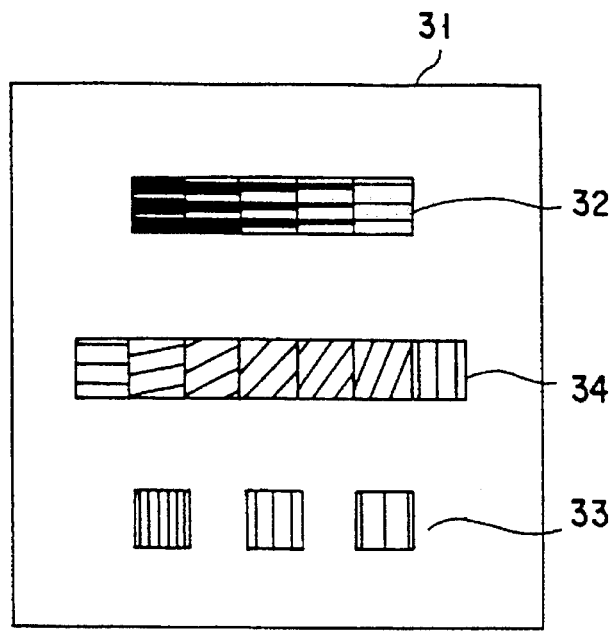
FIG. 8
FIG.9(a)    FIG.9(b)    FIG.9(c)
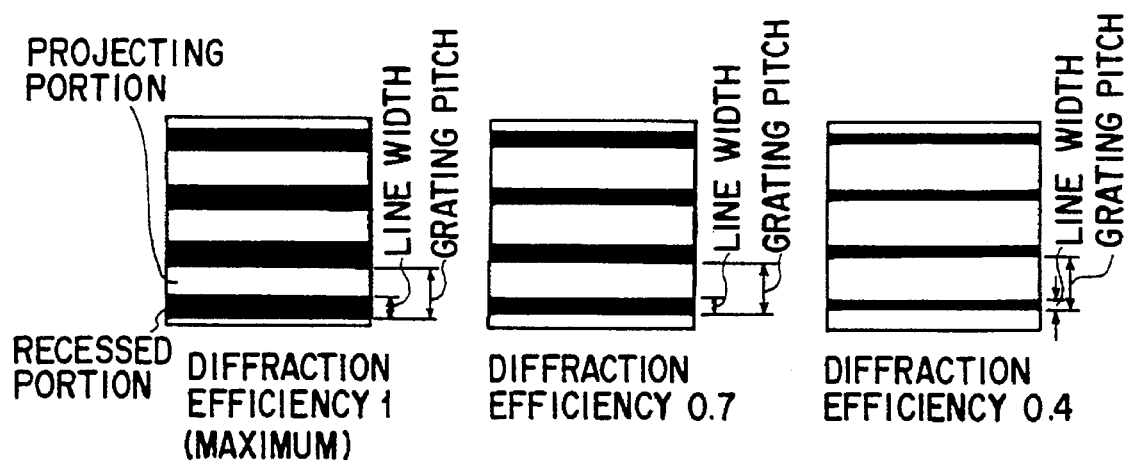

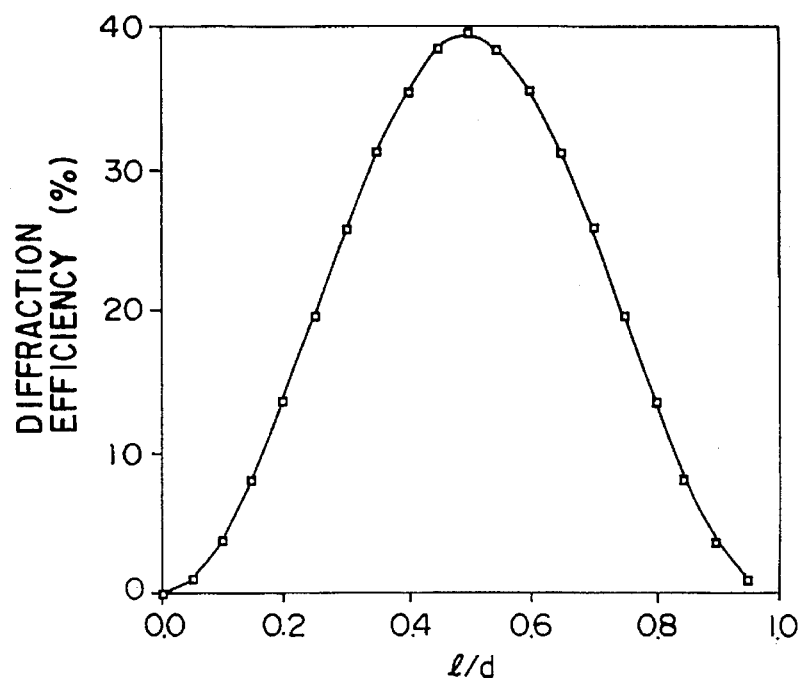
F I G. 10
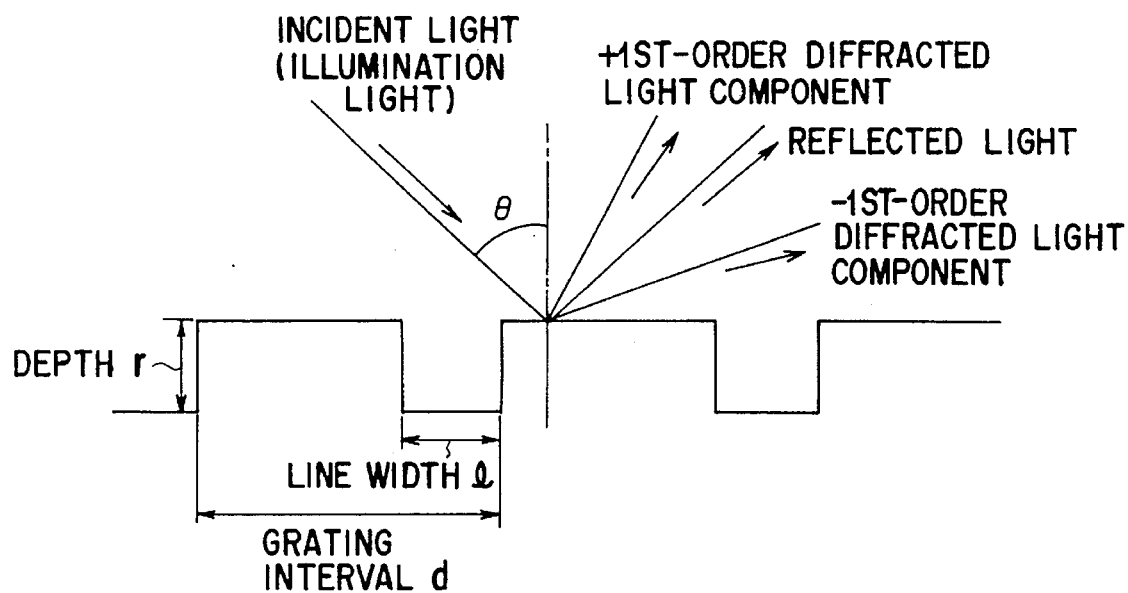
F I G. 11

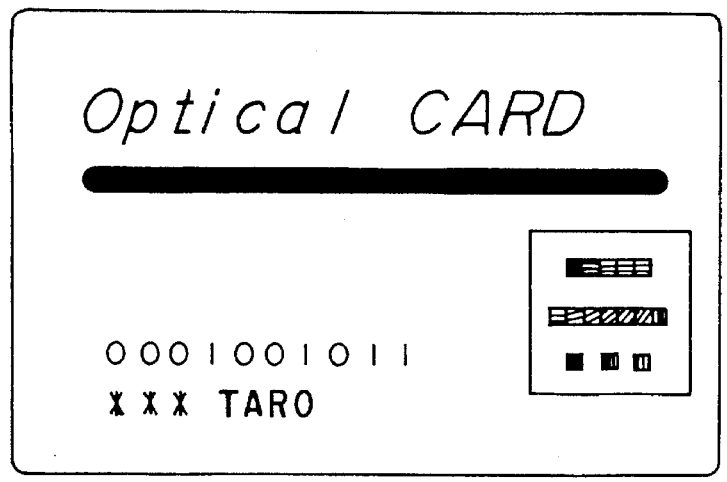
F I G. 12
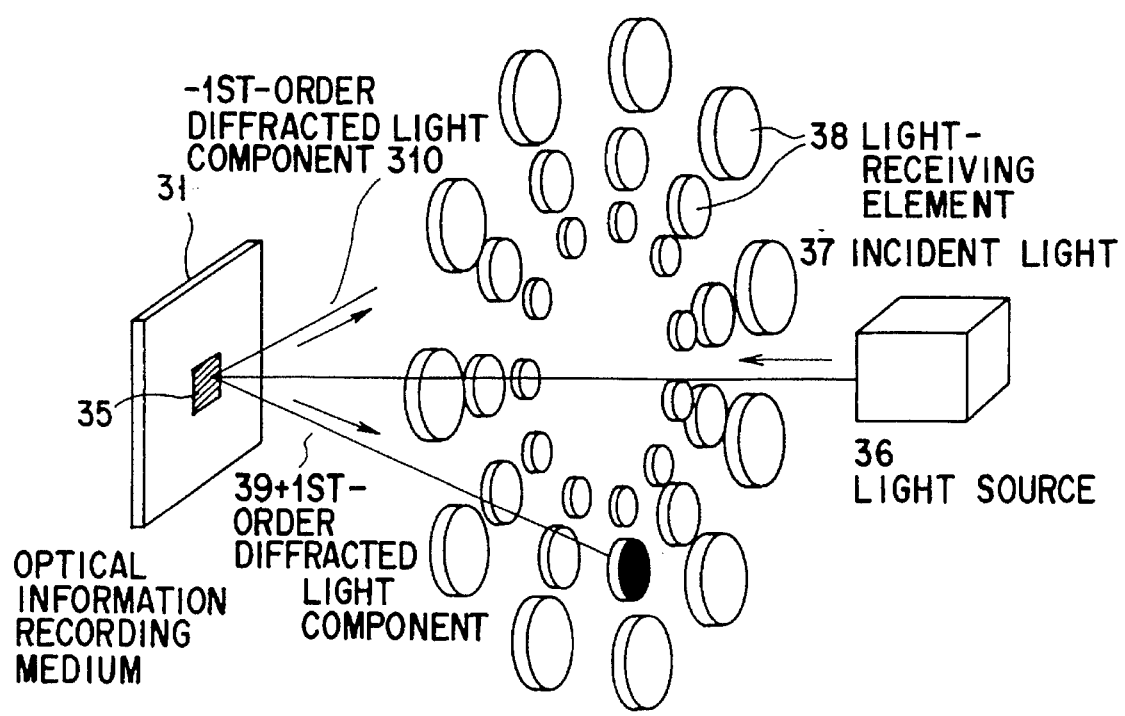
F I G. 13

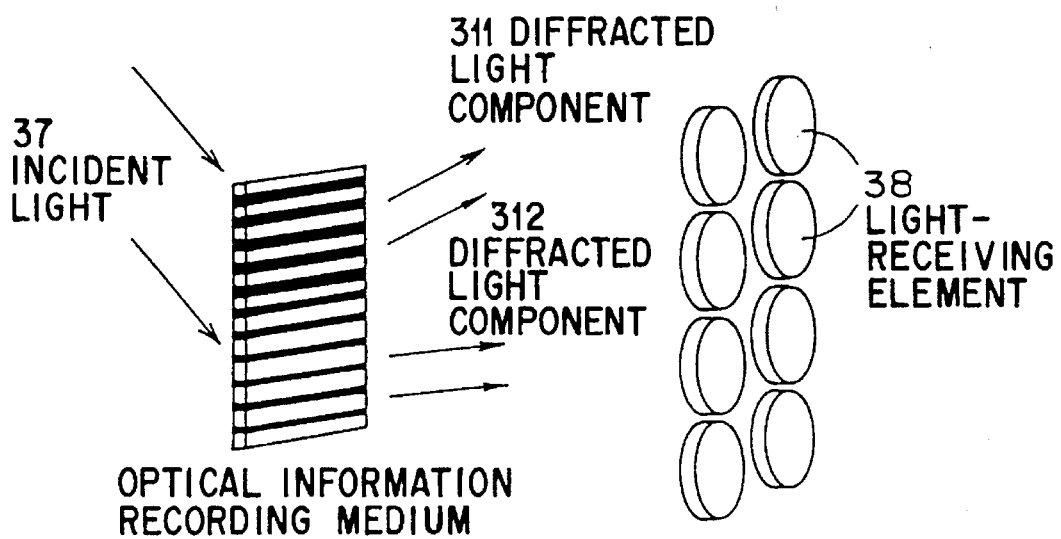
F I G. 14
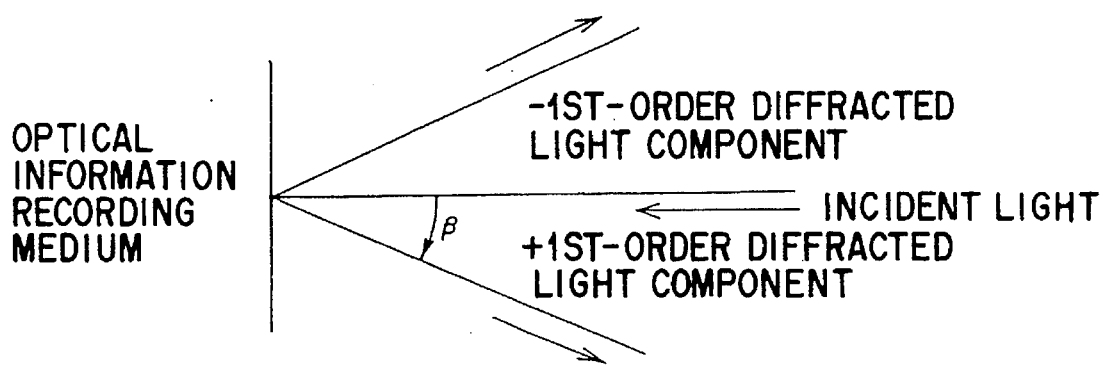
F I G. 17

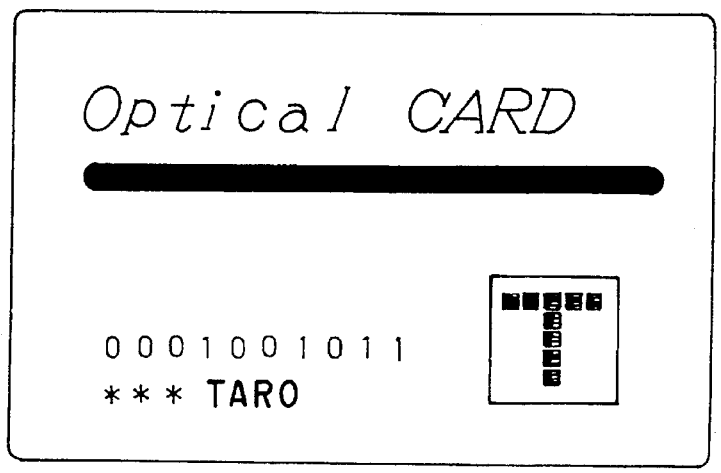
F I G. 18
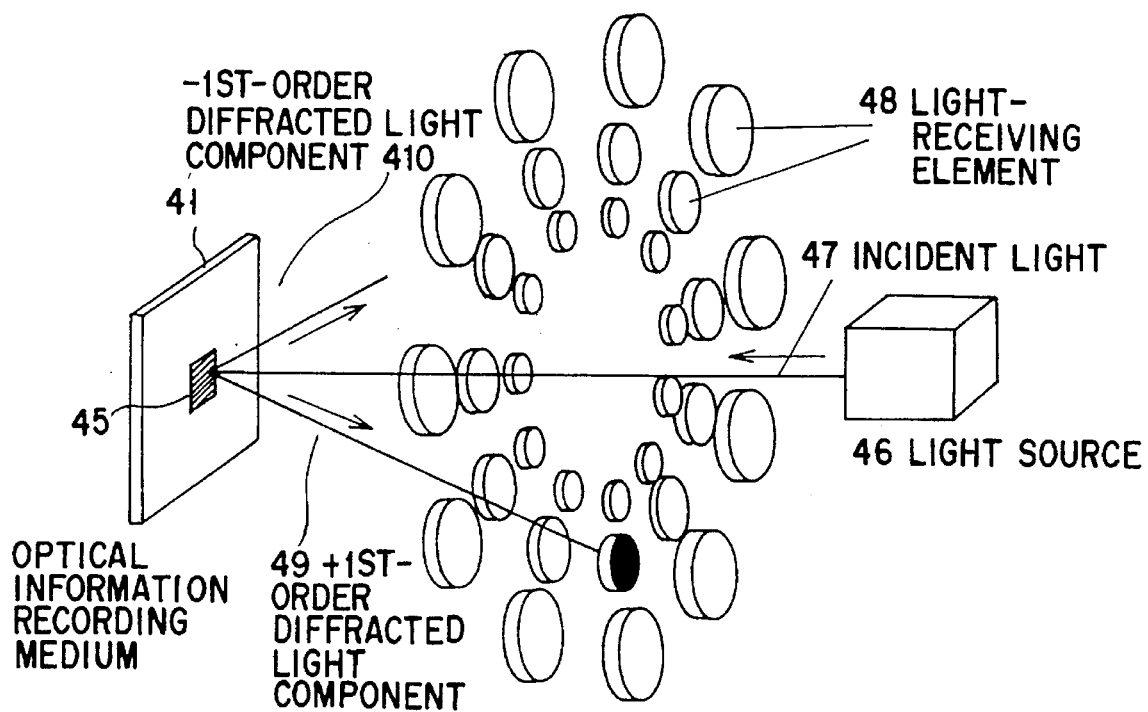
F I G. 19

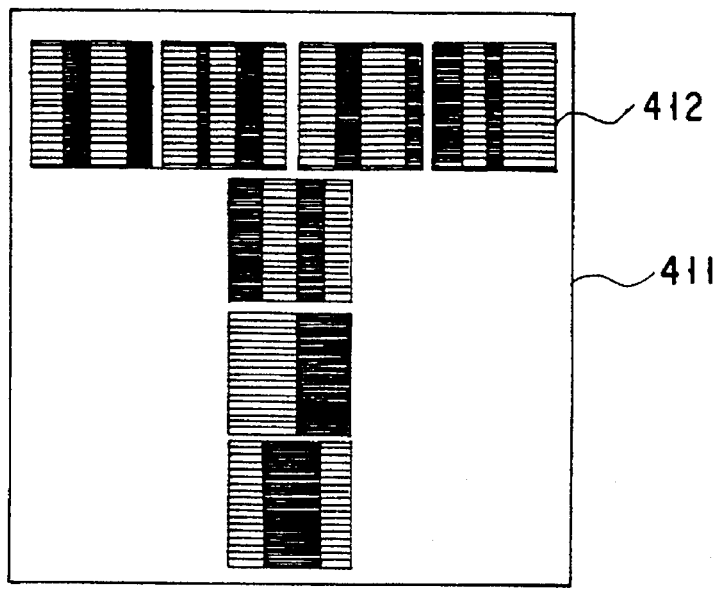
FIG. 20
FIG. 21(a)
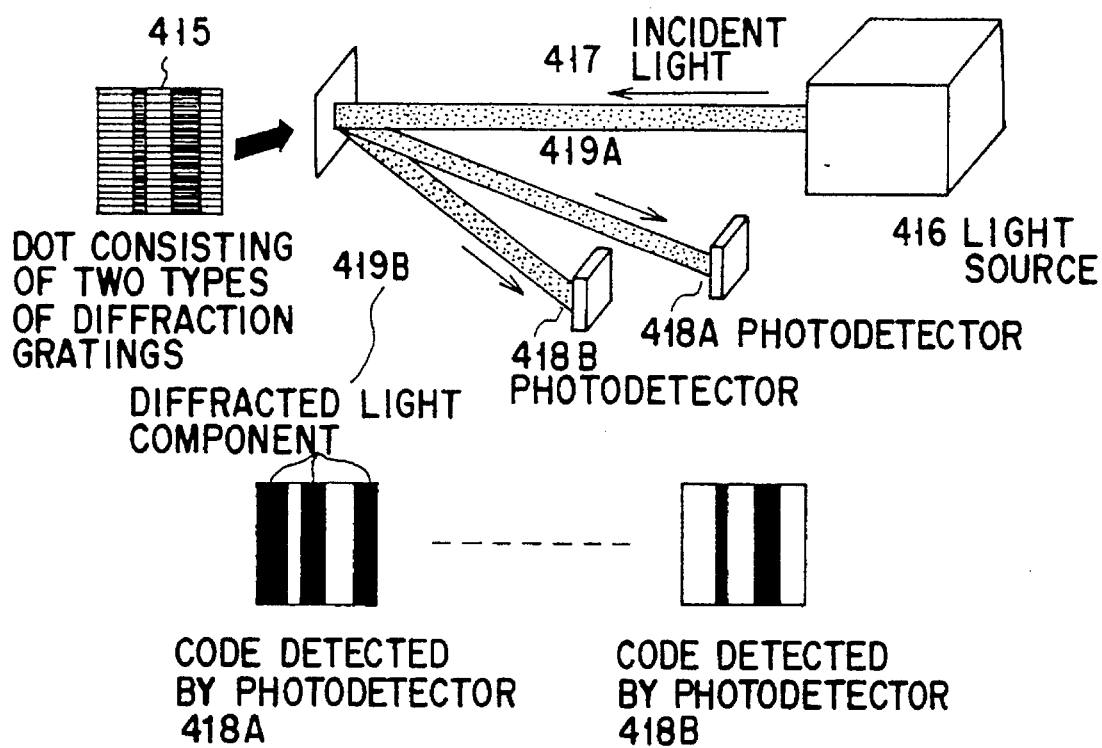
FIG. 21(b)

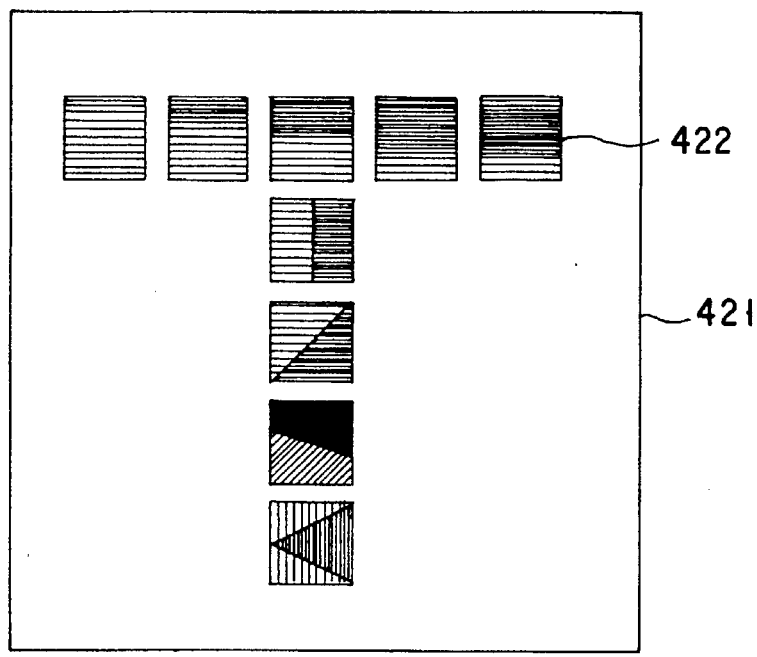
F I G. 22
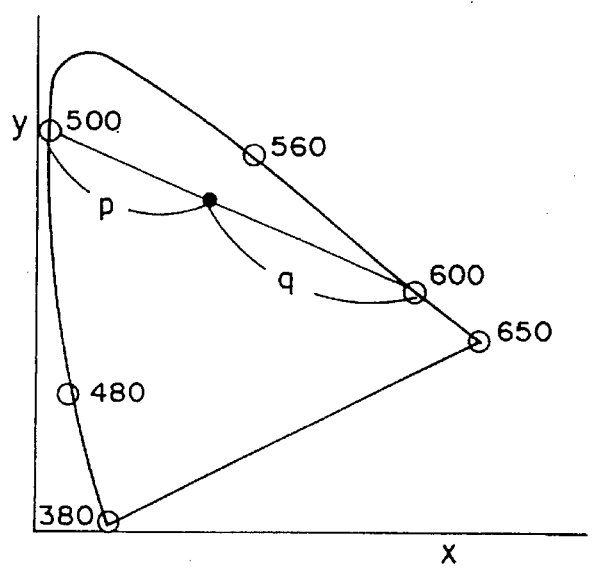
F I G. 23

OPTICAL INFORMATION RECORDING MEDIUM WHICH USES DIFFRACTION GRATING

TECHNICAL FIELD

The present invention relates to an optical information recording medium from which information is optically reproduced and an information reading method for the same and, more particularly, to an optical information recording medium which uses diffraction gratings as information recording elements so that information can be recorded at a very high density and from which a plurality of pieces of information are read at once simultaneously so that information can be read at a higher speed, and an information reading method for the same.

BACKGROUND ART

Generally, optical recording has advantages in that, e.g., a recording medium and a head do not contact each other when compared to magnetic recording, and high-density recording can be performed. Various types of media are known as optical recording media for optical recording, e.g., a read-only medium, a write-once medium, and an erasable programmable medium.

Optical recording media of these types have already been in practical use in various fields in the forms of, e.g., an optical recording disk (e.g., a CD, a CD-ROM, a CD-I, a laser disk, write-once and programmable disks, and a magneto-optical disk) and an optical card (e.g., a ROM card, write-once and programmable cards, and a magneto-optical card).

In a conventional read-only or write-once optical recording disk, a laser beam generated by a light source, e.g., a semiconductor laser, is focused to form a spot having a diameter of 1 to 2 μm on the disk surface, and the surface state of the corresponding portion on the disk surface is detected by utilizing light reflected by the disk surface.

More specifically, when a pit is present, light is randomly reflected to reduce the intensity of the reflected light. When a pit is not present, light is reflected by a mirror surface. Data is read by utilizing a difference (intensity of light) between these two states.

In this case, however, a decrease in spot diameter of the laser light beam is limited to as small as about 1 to 2 μm, and it is impossible to decrease the spot diameter to be extremely smaller than this.

Accordingly, the information amount of the conventional optical recording disk is limited by the fact that one pit on the disk represents one piece of information and by the limited spot diameter of the laser light beam. As a result, information recording at a high density exceeding a certain limit cannot be performed.

DISCLOSURE OF INVENTION

It is the first object of the present invention to provide an optical information recording medium which uses diffraction gratings as information recording elements so that information can be recorded at a very high density and from which a plurality of pieces of information are read at once simultaneously so that information can be read at a higher speed, and an information reading method for the same.

It is the second object of the present invention to provide an optical information recording medium which uses diffraction gratings as information recording elements so that information can be recorded at a very high density, from which a plurality of pieces of information are read at once simultaneously so that information can be read at a higher speed, and which can be produced in mass production with a good formability at a low cost, and an information reading method for the same.

It is the third object of the present invention to provide an optical information recording medium which uses diffraction gratings as information recording elements so that information can be recorded at a very high density, from which a plurality of pieces of information are read at once simultaneously so that information can be read at a higher speed, and which can improve a security effect, and an information reading method for the same.

In order to achieve the first object, in an optical information recording medium according to the first aspect of the present invention, at least one cell comprising diffraction gratings is disposed on a planar substrate, and the cell is divided into $n$ ($n$ is an integer of 2 or more) regions such that each divided region represents one binary data.

Particularly, a cell comprising diffraction gratings having at least either different inclinations or different grating pitches and formed in the divided regions is used as the cell.

A cell comprising diffraction gratings which are obtained by aligning curved gratings parallel to each other to have constant grating pitches is used as the cell.

A cell comprising diffraction gratings which are obtained by aligning curved gratings parallel to each other to have different grating pitches is used as the cell.

A cell comprising diffraction gratings which are obtained by aligning concentric circles at a predetermined gap is used as the cell, and the cell is divided into n regions by lines extending through the center of the concentric circles such that each divided region represents one binary data.

A cell comprising diffraction gratings which are obtained by aligning concentric circles at different gaps is used as the cell, and the cell is divided into $n$ regions by lines extending through the center of the concentric circles such that each divided region represents one binary data.

Either a reflection type cell or a transmission type cell is used as the cell.

According to an information reading method for an optical information recording medium according to the first aspect of the present invention, light-receiving elements corresponding in number to a number $n$ of divided regions of the cell are disposed to correspond to the divided regions, and one incident light beam is caused to be incident on the cell, and diffracted light components emerging from the divided regions of the cell are received by the light-receiving elements, thereby reproducing information.

Beam-like light is caused to be incident as the incident light.

In order to achieve the second object of the present invention, in an optical information recording medium according to the second aspect of the present invention, which is formed by disposing at least one cell comprising small diffraction gratings on a surface of a planar substrate, a ratio of a line width to a grating pitch of the diffraction gratings constituting the diffraction grating cell is appropriately changed based on first original data used for manufacturing a main body of the optical information recording medium, thereby recording first data.

A ratio of a line width to a grating pitch of the diffraction gratings constituting the diffraction grating cell is appropriately changed based on first original data used for manufacturing a main body of the optical information recording medium, thereby recording first data, and a grating pitch of the diffraction gratings constituting the diffraction grating cell is appropriately changed based on second original data used for manufacturing the main body of the optical information recording medium, thereby recording second data.

A ratio of a line width to a grating pitch of the diffraction gratings constituting the diffraction grating cell is appropriately changed based on first original data used for manufacturing a main body of the optical information recording medium, thereby recording first data, and an azimuth angle of diffraction of the diffraction gratings constituting the diffraction grating cell is appropriately changed based on third original data used for manufacturing the main body of the optical information recording medium, thereby recording third data.

A ratio of a line width to a grating pitch of the diffraction gratings constituting the diffraction grating cell is appropriately changed based on first original data used for manufacturing a main body of the optical information recording medium, thereby recording first data, a grating pitch of the diffraction gratings constituting the diffraction grating cell is appropriately changed based on second original data used for manufacturing the main body of the optical information recording medium, thereby recording second data, and an azimuth angle of diffraction of the diffraction gratings constituting the diffraction grating cell is appropriately changed based on third original data used for manufacturing the main body of the optical information recording medium, thereby recording third data.

An intensity of diffracted light component is coded based on the following equation as a ratio of the line width to the grating pitch of the diffraction gratings:

$$\eta = \left(\frac{2}{\pi}\right)^2 \sin^2\left(\frac{2\pi}{\lambda} \frac{r}{\cos\theta}\right) \sin\left(\frac{\pi}{d} l\right)^2$$

where $\eta$ is the diffraction efficiency (a value of 0 to 1), $r$ is the depth of the diffraction gratings, $l$ is the line width, $d$ is the grating pitch, $\theta$ is the angle of incidence of reproduced illumination light, and $\lambda$ is the wavelength of the reproduction illumination light.

Either a reflection type cell or a transmission type cell is used as the cell.

According to an information reading method for an optical information recording medium of the second aspect of the present invention, at least one light-receiving element is disposed, one incident light beam is caused to be incident on the diffraction grating cell, and a diffracted light component emerging from the diffraction grating cell is received by the light-receiving element, so that the first data is reproduced as a change in intensity of the diffracted light component.

A plurality of light-receiving elements are disposed, one incident light beam is caused to be incident on the diffraction grating cell, and diffracted light components emerging from the diffraction grating cell are received by the light-receiving elements, so that the first data is reproduced as a change in intensity of the diffracted light component and the second data is reproduced as a change in diffraction angle of the diffracted light component.

A plurality of light-receiving elements are disposed, one incident light beam is caused to be incident on the diffraction grating cell, and diffracted light components emerging from the diffraction grating cell are received by the light-receiving elements, so that the first data is reproduced as a change in intensity of the diffracted light component and the third data is reproduced as a change in exit direction of the diffracted light component.

A plurality of light-receiving elements are disposed, one incident light beam is caused to be incident on the diffraction grating cell, and diffracted light components emerging from the diffraction grating cell are received by the light-receiving elements, so that the first data is reproduced as a change in intensity of the diffracted light component, the second data is reproduced as a change in diffraction angle of the diffracted light component, and the third data is reproduced as a change in exit direction of the diffracted light component.

Beam-like light is caused to be incident as the incident light.

In order to achieve the third object of the present invention according to the third aspect of the present invention, in an optical information recording medium formed by disposing at least one cell comprising small diffraction gratings on a surface of a planar substrate, the diffraction grating cell is divided into a plurality of regions, in the same diffraction grating cell, the respective regions are constituted by diffraction gratings having the same azimuth angle but different grating pitches, a grating pitch of the diffraction gratings constituting at least one of the respective regions is appropriately set based on original data used for manufacturing a main body of the optical information recording medium main body, thereby recording data.

The diffraction grating cell is divided into a plurality of regions, in the same direction grating cell, the respective regions are constituted by diffraction gratings having the same azimuth angle but different grating pitches, and shapes and positions of the respective regions are appropriately set in units of cells based on original data used of manufacturing a main body of the optical information recording medium, thereby recording data.

The diffraction grating cell is divided into a plurality of regions, in the same diffraction grating cell, the respective regions are constituted by diffraction gratings having the same azimuth angle but different grating pitches, a grating pitch of the diffraction gratings constituting at least one of the respective regions is appropriate set base on first original data used for manufacturing a main body of the optical information recording medium, thereby recording first data, and shapes and positions of the respective regions are appropriately set based on the second original data used for manufacturing the main body of the optical information recording medium main body, thereby recording second data.

Particularly, the grating pitch of the diffraction gratings and an area of the region are set such that a wavelength and the ratio of an intensity of a diffracted light component emerging from each region of the same diffraction grating cell corresponds to the color of one point on a chromaticity digram from each cell.

A plurality of the diffraction grating cells are disposed, and azimuth angles of the diffraction gratings constituting the diffraction grating cells are changed between the cells, thereby recording the third data.

Either a reflection type diffraction grating cell or a transmission type diffraction grating cell is used as the diffraction grating cell.

According to an information reading method for an optical information recording medium of the third aspect of the present invention, a plurality of light-receiving elements are disposed, one incident light beam is caused to be incident on the diffraction grating cell, and diffracted light components emerging from the diffraction grating cell are received by the light-receiving elements, so that the data is reproduced as a change in diffraction angle of the diffracted light component of each region of the diffraction grating cell.

At least one light-receiving element is disposed, one incident light beam is caused to be incident on the diffraction grating cell, and a diffracted light component emerging from the diffraction grating cell is received by the light-receiving element, so that the data is reproduced as a spatial distribution of the diffracted light component in each region of the diffraction grating cell.

Furthermore, a plurality of light-receiving elements are disposed, one incident light beam is caused to be incident on the diffraction grating cell, and diffracted light components emerging from the diffraction grating cell are received by the light-receiving elements, so that the first and second data are reproduced as a diffraction angle and a spatial distribution of the diffracted light component of each region in the diffraction grating cell.

Particularly, in an information reading method for the above optical information recording medium, a plurality of the light-receiving elements are disposed, and changes in spatial distribution of the diffracted light components received by the light-receiving elements are compared with each other, thereby determining validity of reproduced data.

Beam-like light is caused to be incident as the incident light.

Therefore, according to the information recording method for the optical information recording medium of the first aspect of the present invention, a cell comprising the diffraction gratings is divided into two or more regions and each divided region represents one binary data, thereby recording a plurality of data in one cell.

According to the information reading method for the optical information recording medium of the first aspect of the present invention, when information is to be read, one incident light beam is caused to be incident on the cell, and data is reproduced by receiving by diffracted light components emerging from the respective divided regions of the cell by the respective light-receiving elements, thereby reproducing a plurality of data at once simultaneously.

According to the optical information recording medium of the second aspect of the present invention, the ratio of the line width to the grating pitch of the diffraction gratings constituting the diffraction grating cell is approximately changed based on the first original data used for manufacturing the main body of the optical information recording medium, thereby recording the first data. Therefore, data reproduction can be performed by changing the intensity of the diffracted light component.

Since the gray scale is expressed by the ratio of the line width to the grating pitch of the diffraction gratings constituting the diffraction grating cell, the distribution of the diffraction gratings is uniform, and the formability in embossing is good.

Since data recording is not related to the depth of the diffraction grating, this optical information recording medium can be manufactured by an apparatus, e.g., an electron beam lithography system capable of binary expression, which has a fine-processing capability. Control of the depth in the duplicate can be easily performed. This optical information recording medium can be duplicated easily by, e.g., embossing, thereby realizing mass production at a low cost.

According to the optical information recording medium of the second aspect of the present invention, the second data is recorded by appropriately changing the grating pitch of the diffraction gratings constituting the diffraction grating cell based on the second original data used for manufacturing the optical information recording medium main body. Thus, data reproduction by changing the diffraction angle of the diffracted light component can be performed.

Furthermore, according to the optical information recording medium of the second aspect of the present invention, the third data is recorded by appropriately changing the azimuth angle of the diffraction gratings constituting the diffraction grating cell based on the third original data used for manufacturing the optical information recording medium main body. Thus, data reproduction by changing the exit direction of the diffracted light component can be performed.

According to the information reading method for the optical information recording medium of the second aspect of the present invention, when information is to be read, one incident light beam is caused to be incident on the diffraction grating cell, and diffracted light components emerging from the diffraction grating cell are received by the light-receiving elements, so that data is reproduced as a change in intensity of the diffracted light component, thereby reproducing multivalue data.

According to the information reading method for the optical information recording medium of the second aspect of the present invention, when information is to be read, one incident light beam is caused to be incident on the diffraction grating cell, and diffracted light components emerging from the diffraction grating cell are received by the light-receiving elements, so that data is reproduced as a change in diffraction angle of the diffracted light component, thereby reproducing a plurality of data at once simultaneously.

According to the information reading method for the optical information recording medium of the second aspect of the present invention, when information is to be read, one incident light beam is caused to be incident on the diffraction grating cell, and diffracted light components emerging from the diffraction grating cell are received by the light-receiving elements, so that data is reproduced as a change in exit direction of the diffracted light component, thereby reproducing a plurality of data at once simultaneously.

According to the optical information recording medium of the third aspect of the present invention, a cell is divided into a plurality of regions, in the same diffraction grating cell, the respective regions are constituted by diffraction gratings having the same grating angle but different grating pitches, and a grating pitch of the diffraction gratings constituting at least one of the respective regions is appropriately set based on original data used for manufacturing a main body of the optical information recording medium main body, thereby recording data, so that reproduction of multivalue data by means of a diffraction angle of the diffracted light component of each region of the diffraction grating cell is performed.

According to the optical information recording medium of the third aspect of the present invention, the shapes and positions of the respective regions are appropriately set in units of cells based on original data used for manufacturing the main body of the optical information recording medium, thereby recording data, so that data reproduction by means of a change in spatial distribution of the diffracted light component of each region of the diffraction grating cell is performed.

Furthermore, according to the optical information recording medium of the third aspect of the present invention, the azimuth angle of the diffraction gratings constituting the diffraction grating cell is appropriately changed based on the third original data used for manufacturing the main body of the optical information recording medium, thereby recording third data, so that data reproduction by means of a change in exit direction of the diffracted light component is performed.

From the foregoing, a plurality of different data can be recorded at a portion (constituted by a plurality of diffraction grating cells designed for the same point on the chromaticity coordinates) which is seen only as the same color by observation with a naked eye. The present invention is not limited to recording in the same color, but an arbitrary image, e.g., a lithography pattern, can be formed in a plurality of colors.

According to the information reading method of the optical information recording medium of the third aspect of the present invention, when information is to be read, one incident light beam is caused to be incident on a diffraction grating cell, and diffracted light components emerging from the diffraction grating cell are received by the light-receiving elements, so that data is reproduced as a change in diffraction angle of the diffracted light component of each region of the diffraction grating cell, thereby reproducing a plurality of data at once simultaneously.

According to the information reading method of the optical information recording medium of the third aspect of the present invention, when information is to be read, one incident light beam is caused to be incident on the diffraction grating cell, and diffracted light components emerging from the diffraction grating cell are received by the light-receiving elements, so that data is reproduced as the spatial distribution of the diffracted light component in each region of the diffraction grating cell, thereby reproducing a plurality of data at once simultaneously.

BRIEF DESCRIPTION OF THE DRAWINGS

FIG. 2 is a schematic view showing the arrangement of an optical system for realizing an information reading method for an optical information recording medium according to the first embodiment;

FIG. 3 is a schematic view showing the arrangement of an optical system for realizing another information reading method for an optical information recording medium according to the first embodiment;

FIG. 8 is a plan view showing an optical information recording medium as the second embodiment according to the second aspect of the present invention;

FIG. 9 includes plan views showing arrangements of one cell applied to the optical information recording medium according to the second aspect of the present invention;

FIG. 10 is a graph showing an example of the relationship between the ratio of the line width of diffraction gratings constituting the cell of the optical information recording medium as the second embodiment, to the grating pitch, and a diffraction efficiency;

FIG. 11 is a sectional view showing the arrangement of rectangular diffraction gratings constituting the cell of the optical information recording medium as the second embodiment;

FIG. 12 is a plan view showing the arrangement of the optical information recording medium as the second embodiment applied to a card-like base material;

FIG. 13 is a schematic view showing the arrangement of an optical system for realizing an information reading method for the optical information recording medium as the second embodiment;

FIG. 14 is a schematic view showing the state of an information reading method for an optical information recording medium as the third embodiment according to the second aspect of the present invention;

FIG. 17 is a view showing the state of diffraction in the optical information recording medium as the fourth embodiment;

FIG. 18 is a plan view showing the arrangement of the optical information recording medium as the fourth embodiment applied to a card-like base material;

FIG. 19 is a schematic view showing the arrangement of an optical system for realizing an information reading method for the optical information recording medium as the fourth embodiment;

FIG. 20 is a plan view showing the optical information recording medium as the fifth embodiment according to the third aspect of the present invention;

FIG. 21 includes schematic views showing the arrangement of an optical system for realizing an information reading medium for the optical information recording medium as the fifth embodiment;

FIG. 22 is a plan view showing the optical information recording medium as the sixth embodiment according to the third aspect of the present invention; and FIG. 23 is a chromaticity diagram for explaining the method of setting the grating pitch and an area ratio of the diffraction gratings of a cell applied to the optical information recording medium as the sixth embodiment.

BEST MODE OF CARRYING OUT THE INVENTION

The gist of the first aspect of the present invention resides in realization of an optical information recording medium which uses, as information recording elements, diffraction gratings consisting of a plurality of regions having at least one of different azimuth angles and different grating pitches, and from which optical information can be read.

(First Embodiment)

FIGS. 1(a) to 1(d) are plan views respectively showing the arrangements of diffraction gratings (to be merely referred to as a cell hereinafter) applied to an optical information recording medium according to the first aspect of the present invention.

Figure 1A:
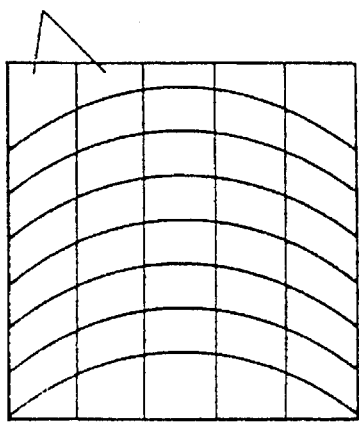
FIG. 1 includes plan views each showing diffraction gratings as the first embodiment applied to an optical information recording medium according to the first aspect of the present invention.

More specifically, the cell shown in FIG. 1(a) consists of diffraction gratings in which curved gratings are aligned parallel to each other to have a constant grating pitch. This cell is equally divided into a plurality of (in this embodiment, five in the horizontal direction) regions, and each divided region represents one binary data.

Figure 1B:
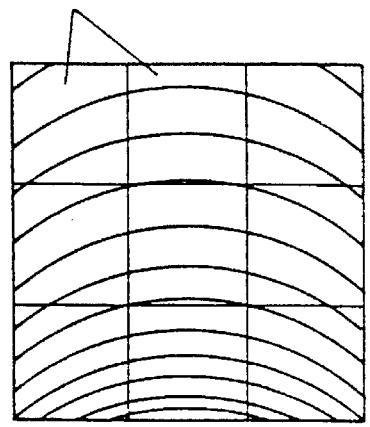

The cell shown in FIG. 1(b) consists of diffraction gratings in which curved gratings are aligned parallel to each other to have different grating pitches. This cell is equally divided into a plurality of (in this embodiment, 3 in the horizontal direction ×3 in the vertical direction =9) regions, and each divided region represents one binary data.

Figure 1C:
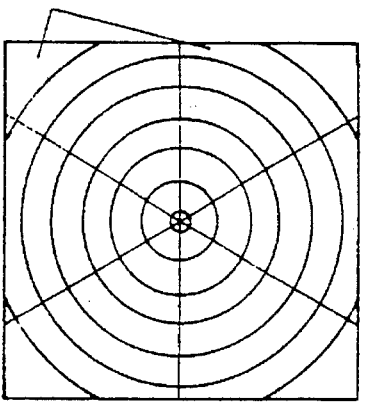

The cell shown in FIG. 1(c) consists of diffraction gratings in which concentric circles are aligned at a constant gap. This cell is equally divided into a plurality of (in this embodiment, 6 in the circumferential direction) regions, and each divided region represents one binary data.

Figure 1D:
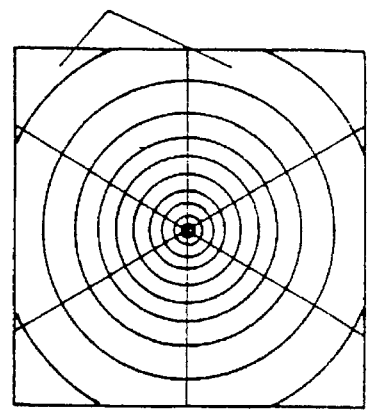

The cell shown in FIG. 1(d) consists of diffraction gratings in which concentric circles are aligned to have different gaps. This cell is equally divided into a plurality of (in this embodiment, 6 in the circumferential direction) regions, and each divided region represents one binary data.

In this embodiment, at least one cell of FIGS. 1(a) to 1(d) is disposed on a planar substrate through a reflection layer, thus constituting a reflection type optical information recording medium.

In the optical information recording medium having the above arrangement, a cell comprising diffraction gratings is disposed on a planar substrate, and the cell is divided into a plurality of regions having at least one of different azimuth angles and different grating pitches, so that each divided region represents one binary data. Hence, a plurality of pieces of data can be recorded in one cell, thereby recording information at a very high density.

To manufacture the optical information recording medium of this embodiment, the following methods are available.

(a) Diffraction gratings are formed only on a region where data exists, by an apparatus, e.g., a electron beam lithography system which has a fine-processing capability.

(b) Diffraction gratings are formed on the entire region by the method (a), and thereafter a light-shielding layer is formed on the surface of a region where data does not exist, or the diffraction grating in a region where data does not exist is destroyed.

In this case, since the diffraction grating drawn by the electron beam has a comparatively simple shape, as shown in FIGS. 1(a) to 1(d), the amount of calculation can be small. Since the electron beam can be easily controlled during drawing, the diffraction grating can be manufactured comparatively easily. Since the optical information recording medium manufactured in this manner is of a surface relief type, it can be manufactured in mass production at a low cost by employing an embossing technique.

Furthermore, in the method (b), if a duplicate obtained by embossing from an original having the diffraction grating formed on its entire surface is used and a light-shielding layer having coded individual data is formed on the surface of the duplicate later on, individual information can be input comparatively easily. Simultaneously, if a duplicate obtained by embossing is used, data is input by destroying/non-destroying a corresponding region of a corresponding cell, and the optical information recording medium of this embodiment obtained in this manner is used as the embossing original. The optical information recording medium can be manufactured in mass production at a low cost.

An information reading method for the optical information recording medium of this embodiment formed in the above manner will be described.

FIG. 2 is a schematic view showing the arrangement of an optical system for realizing an information reading method for the optical information recording medium according to this embodiment. FIG. 2 shows a case wherein a cell is used which is equally divided into five regions in the horizontal direction, as shown in FIG. 1(a), such that each divided region represents one binary data.

Referring to FIG. 2, a substrate 1 is equally divided into five regions in the horizontal direction, as in FIG. 1(a), and each divided region represents one binary data. Beam-like incident light 3 can be caused to be incident on this substrate 1 from a light source 2, e.g., a laser light beam source. Light-receiving elements 4 corresponding in number to the divided regions of the cell, i.e., five light-receiving elements 4 are linearly disposed to correspond to the respective divided regions, thereby receiving light from the cell.

To read information from the optical information recording medium, the beam-like incident light 3 is caused to be incident on the cell from the light source 2. When the incident light 3 is incident on the cell, diffracted light components 5 emerge to all of the five light-receiving elements 4.

Accordingly, if binary data is expressed by providing or not providing the light-shielding layer (or diffraction grating) in each of the five divided regions, the diffracted light components 5 emerge to only light-receiving elements 4 corresponding to divided regions where data exist (data =1) in response to the incident light 3, as shown in FIG. 2, and data is reproduced. Reference numeral 6 denotes reflected light from the cell.

This means that the cell of this embodiment has an information recording density which is five times that of one pit of a conventional optical recording disk. More specifically, whereas the conventional optical recording disk can record only one data in one pit, one data can be recorded in one divided region, and data corresponding in number to the divided regions (five) can be recorded in one cell in the cell of this embodiment.

when a plurality of cells are disposed on the planar substrate and operations of reading five data instantaneously are sequentially performed by rotating the substrate, for example, even if the rotating speed is the same as the conventional rotating speed, information can be read at a speed five times that the conventional information reading speed.

FIG. 3 is a schematic view showing the arrangement of an optical system for realizing an information reading method for the optical information recording medium according to this embodiment. FIG. 3 shows a case wherein a cell is used which is equally divided into 3 in the horizontal direction ×3 in the vertical direction =9 regions, as shown in FIG. 1(b), such that each divided region represents one binary data.

Referring to FIG. 3, a substrate 11 is equally divided into 3 in the horizontal direction ×3 in the vertical direction =9 regions, as in FIG. 1(b), and each divided region represents one binary data. Beam-like incident light 13 can be incident on this substrate 11 from a light source 12, e.g., a laser light beam source. Light-receiving elements 14 corresponding in number to the divided regions of the cell, i.e., nine light-receiving elements 14 are disposed in a matrix manner to correspond to the respective divided regions, thereby receiving light from the cell.

To read information from the optical information recording medium, the beam-like incident light 13 is caused to be incident on the cell from the light source 12. When the incident light 13 is incident on the cell, diffracted light components 15 emerge to all of the nine light-receiving elements 14.

Accordingly, if binary data is expressed by providing or not providing the light-shielding layer (or diffraction grating) in each of the nine divided regions, the diffracted light components 15 emerge to only light-receiving elements 14 corresponding to divided regions where data exist (data =1) in response to the incident light 13, as shown in FIG. 3, and data is reproduced. Reference numeral 16 denotes reflected light from the cell.

This means that the cell of this embodiment has an information recording density which is nine times that of one pit of a conventional optical recording disk. More specifically, whereas the conventional optical recording disk can record only one data in one pit, one data can be recorded in one divided region, and data corresponding in number to the divided regions (nine) can be recorded in one cell in the cell of this embodiment.

when a plurality of cells are disposed on the planar substrate and operations of reading nine pieces of data at once are sequentially performed by rotating the substrate, for example, even if the rotating speed is the same as the conventional rotating speed, information can be read at a speed nine times that the conventional information reading speed.

Figure 4:
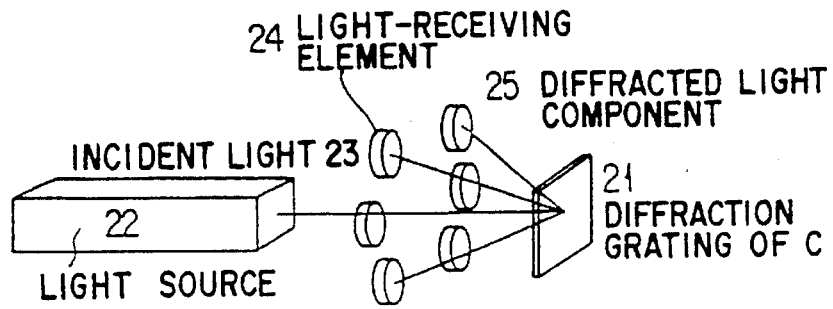
FIG. 4 is a schematic view showing the arrangement of an optical system for realizing still another information reading method for an optical information recording medium according to the first embodiment.

FIG. 4 is a schematic view showing an arrangement of an optical system for realizing an information reading method for the optical information recording medium according to this embodiment. FIG. 4 shows a case wherein a cell is used which is equally divided into six regions in the circumferential direction, as shown in FIG. 1(c) or 1(d), such that each divided region represents one binary data.

Referring to FIG. 4, a substrate 21 is equally divided into six regions in the circumferential direction, as in FIG. 1(c) or 1(d), and each divided region represents one binary data. Beam-like incident light 23 can be incident on this substrate 21 from a light source 22, e.g., a laser light beam source. Light-receiving elements 24 corresponding in number to the divided regions of the cell, i.e., six light-receiving elements 24 are disposed in a circular manner to correspond to the respective divided regions, thereby receiving light from the cell.

To read information from the optical information recording medium, the beam-like incident light 23 is caused to be incident on the cell from the light source 22. When the incident light 23 is incident on the cell, diffracted light components 25 emerge to all the six light-receiving elements Accordingly, if binary data is expressed by providing or not providing the light-shielding layer (or diffraction grating) in each of the six divided regions, the diffracted light components 25 emerge to only light-receiving elements 24 corresponding to divided regions where data exist (data =1) in response to the incident light 23, as shown in FIG. 4, and data is reproduced. Reference numeral 26 denotes reflected light (which propagates along the same optical axis as that of the incident light 23 in the opposite direction to the incident light 23) from the cell.

This means that the cell of this embodiment has an information recording density which is six times that of one pit of a conventional optical recording disk. More specifically, whereas the conventional optical recording disk can record only one data in one pit, one data can be recorded in one divided region, and data corresponding in number to the divided regions (six) can be recorded in one cell in the cell of this embodiment.

When a plurality of cells are disposed on the planar substrate and operations of reading six data instantaneously are sequentially performed by rotating the substrate, for example, even if the rotating speed is the same as the conventional rotating speed, information can be read at a speed six times that the conventional information reading speed.

Figure 5A:
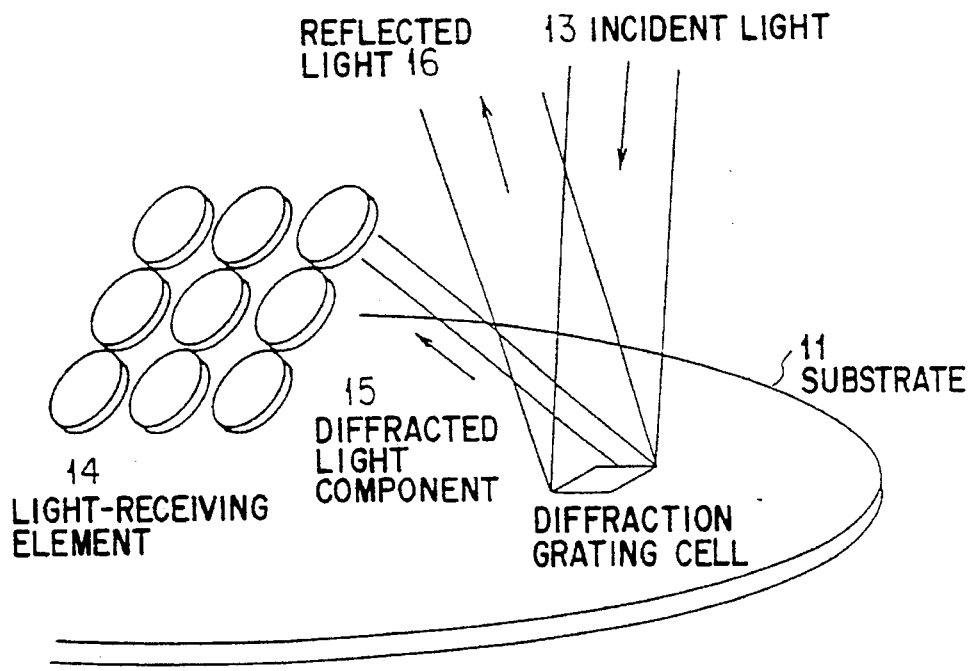
FIG. 5 includes schematic views showing the state of the information reading method for the optical information recording medium according to the first embodiment.
Figure 5B:
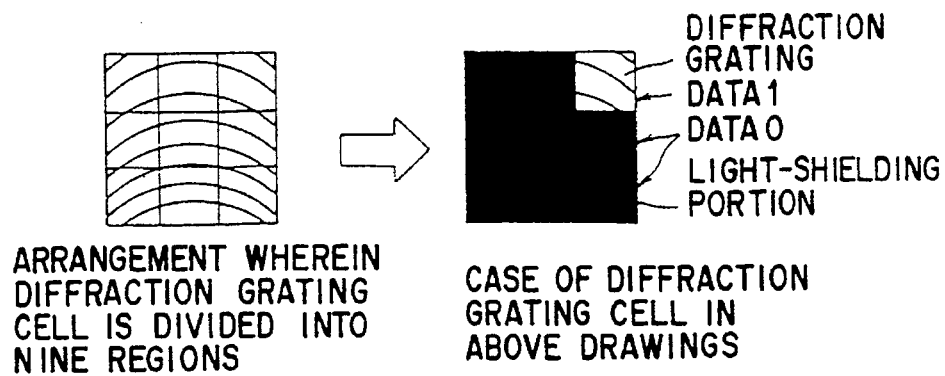
Figure 6A:
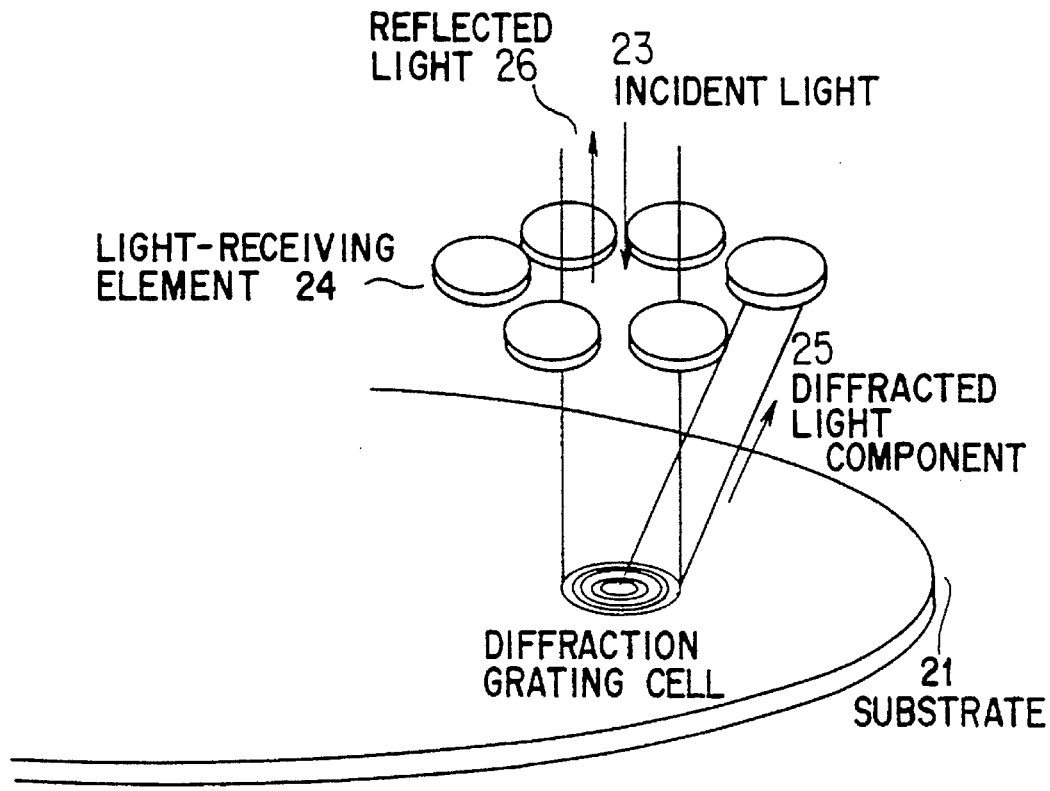
FIG. 6 includes schematic views showing the state of the information reading method for the optical information recording medium according to the first embodiment.
Figure 6B:
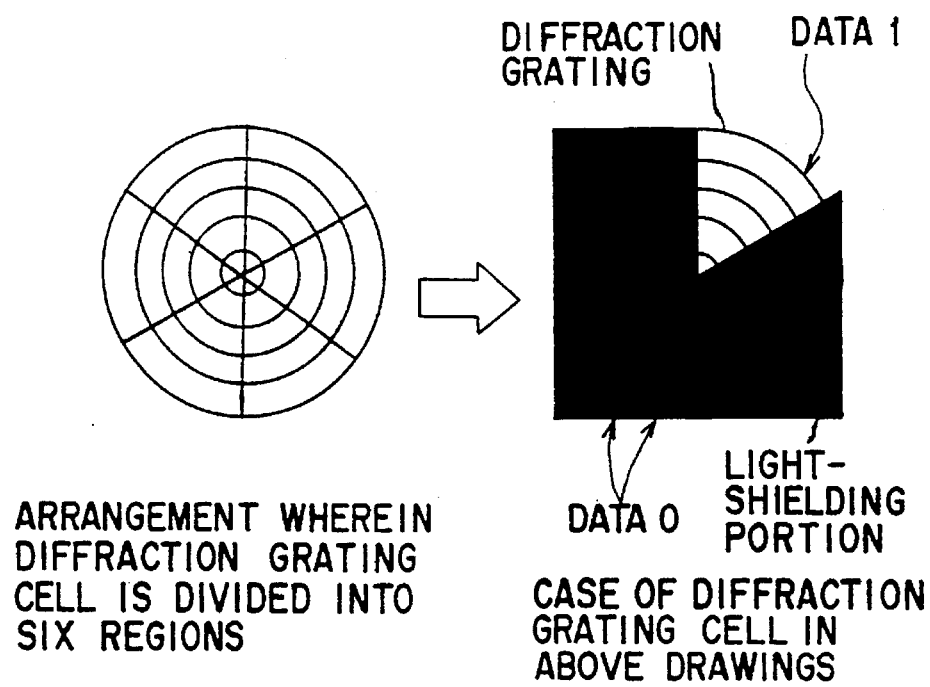
Figure 7A:
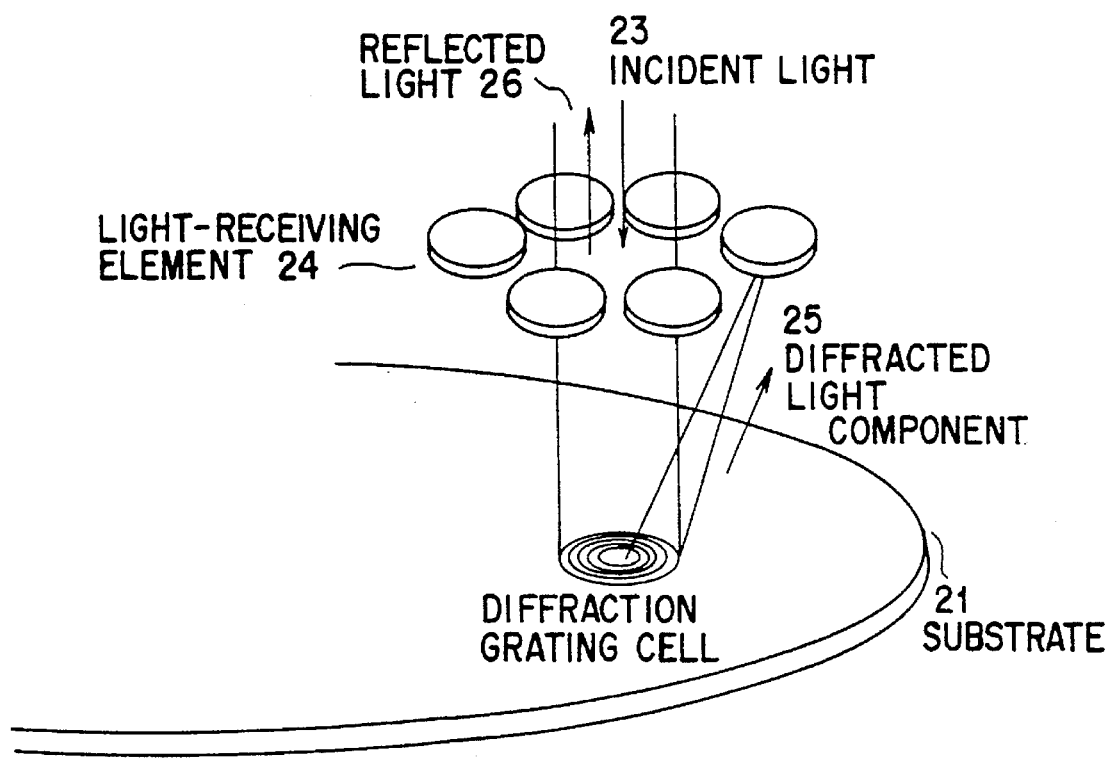
FIG. 7 includes schematic views showing the state of the information reading method for the optical information recording medium according to the first embodiment.
Figure 7B:
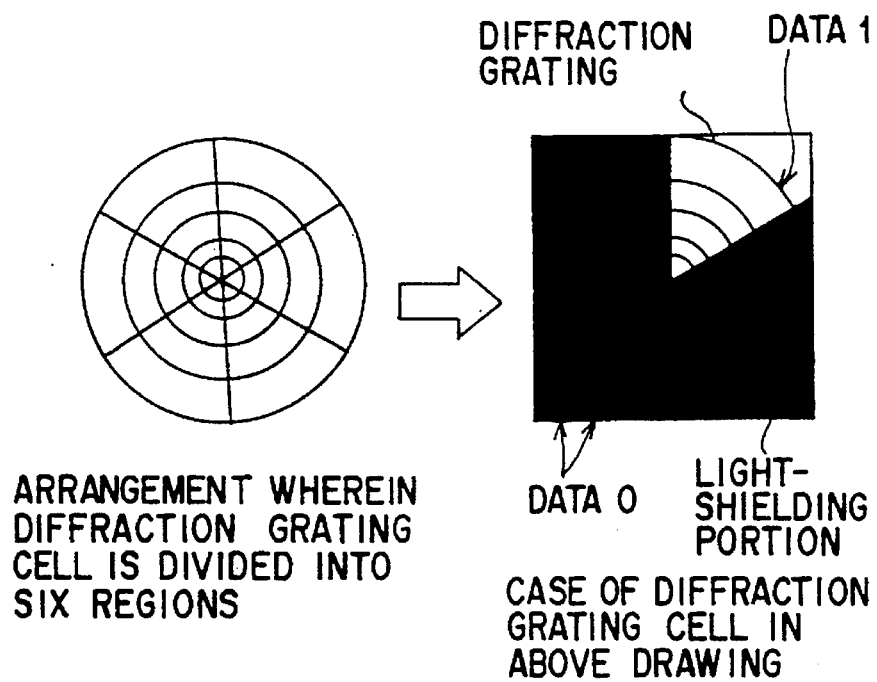

FIGS. 5 to 7 are schematic views showing the states of the information reading method for the optical information recording medium in FIGS. 3 and 4 (in the case of FIGS. 1(c) and 1(d)). The same portions as in FIGS. 2 to 4 are denoted by the same reference numerals.

As described above, in the information reading method for the optical information recording medium of this embodiment, one cell causes diffracted light components to emerge in a plurality of directions simultaneously upon reception of one incident light. Thus, a plurality of data can be simultaneously reproduced by determining whether or not the respective diffracted light components exist, so that information reading at a very high speed can be realized.

The number of divided regions of the diffraction grating can be increased by increasing the spot diameter of the beam-like incident light and the cell. Therefore, the number of exit directions of the diffracted light components can also be increased, so that a larger number of pieces of information can be read at once.

Then, the spot diameter need not be decreased, unlike in the conventional case, and a lens system and the like for decreasing the spot diameter can be omitted or simplified.

When the cell shown in FIG. 1(b) or 1(b) is used, the cell can also have a function of focusing the diffracted light components. Then, errors in light reception by the light-receiving elements can be further decreased.

Furthermore, since the beam-like light is incident on the cell as the incident light, the diffracted light components emerging from the cell also constitute a beam. Then, the light can be easily received by the light-receiving elements, and a read error can be eliminated.

The gist of the second aspect of the present invention resides in the following respects. Namely, when diffraction gratings are used as the information recording elements of an optical information recording medium, data is recorded by appropriately changing the ratio of the line width to the grating pitch of the diffraction gratings constituting the diffraction grating cell, so that the diffraction efficiency of the diffraction grating is controlled, that is, the intensity of the diffracted light component is changed during data reproduction, so that data can be read, thereby realizing an increase in density of data recording.

Also, control of the diffraction efficiency is performed independently of recording information by using the grating pitch and the grating azimuth angle, and control of the diffraction efficiency and information recording are combined as required to record independent data, thereby realizing a further increase in density of data recording.

( Second Embodiment )

FIG. 8 is a plan view showing the arrangement of an reflection type optical information recording medium according to the present invention.

More specifically, as shown in FIG. 8, the optical information recording medium of this embodiment is constituted by disposing, on the surface of a planar substrate 31, a plurality of cells 32, 33, and 34 comprising small diffraction gratings through a reflecting layer (not shown).

The cell 32 records first data by appropriately changing the ratio of the line width to the grating pitch of the diffraction gratings constituting the cell 32 based on the first original data used for manufacturing this optical information recording medium.

The cell 33 records second data by appropriately changing the grating pitch of the diffraction gratings constituting the diffraction grating cell 33 based on the second original data used for manufacturing this optical information recording medium.

The cell 34 records third data by appropriately changing the azimuth angle of the diffraction gratings constituting the cell 34 based on the third original data used for manufacturing this optical information recording medium.

In the cell 32, regarding the ratio of the line width to the grating pitch of the diffraction grating, the intensity of the diffracted light component is coded based on the following equation:

$$\eta = \left(\frac{2}{\pi}\right)^2 \sin^2\left(\frac{2\pi}{\lambda} \frac{r}{\cos\theta}\right) \sin\left(\frac{\pi}{d} l\right)^2$$

where $\eta$ is the diffraction efficiency (a value of 0 to 1), $r$ is the depth of the diffraction grating, $l$ is the line width, $d$ is the grating pitch, $\theta$ is the azimuth angle of incidence of reproduced illumination light, and $\lambda$ is the wavelength of the reproduction illumination light.

Note that this equation is valid only for a surface relief type rectangular diffraction grating having a small depth.

FIG. 9 includes plan views showing arrangements of the diffraction gratings constituting the cell 32 of the above cells.

Referring to FIG. 9, when the line width of the diffraction grating becomes ½ the grating pitch, i.e., when line width: grating pitch =1:2, the diffraction efficiency becomes maximum, as shown in FIG. 10. When the difference between the line width and this value becomes large, the diffraction efficiency become lowered. FIG. 10 is obtained based on the above equation.

Although recessed portions are expressed as lines in FIG. 9, projecting portions may be regarded as lines instead. FIG. 9 shows examples in which the diffraction gratings are formed by a three-dimensional pattern. However, the diffraction grating may be formed in accordance with any method, i.e., a method of changing the light transmittance, reflectance, or the phase (to form the diffraction grating with a three-dimensional pattern correspond to change the phase between the recessed portions and the projecting portions).

An example is a method of forming the diffraction grating by changing the light transmittance or reflectance includes a method of expressing the diffraction grating by changing the density (to express portions corresponding to the recessed or projecting portions in FIG. 9 in black (light absorption or light shielding) and white (reflection or transmittance)).

Another example of forming the diffraction grating by changing the phase includes a method of forming the grating with layers of two media having different refractive indices (to form portions corresponding to the recessed and projecting portions in FIG. 9 with different media).

FIG. 11 is a sectional view showing the arrangement of a rectangular diffraction grating formed with a three-dimensional surface pattern.

As shown in FIG. 11, when the optical information recording medium of this embodiment is formed with the three-dimensional pattern, the depthwise directions can be sufficiently expressed by binary expression. Accordingly, this optical information recording medium can be manufactured also by using a binary device, e.g., an electron beam lithography system, to have a good formability in accordance with simple duplicating process without requiring depth control and the like.

FIG. 12 is a plan view showing an example of a case wherein the optical information recording medium of this embodiment is applied to a card-like base material.

As shown in FIG. 12, since the thickness of the optical information recording medium of this embodiment can be greatly decreased, even when, e.g., this optical information recording medium is adhered to a card-like base material, no problem arises concerning the thickness.

In the optical information recording medium of this embodiment having the above arrangement, the ratio of the line width to the grating pitch of the diffraction gratings constituting the cell 32 is approximately changed based on the first original data used for manufacturing the main body of the optical information recording medium, thereby recording the first data. Therefore, data reproduction can be performed by changing the intensity of the diffracted light component, so that information can be recorded at a very high density.

Since the multivalue is expressed by the ratio of the line width to the grating pitch of the diffraction gratings constituting the cell 32, the distribution of the diffraction grating becomes uniform, and the formability in embossing becomes good.

Since data recording is not related to the depth of the diffraction grating, this optical information recording medium can be manufactured by an apparatus, e.g., an electron beam lithography system capable of binary expression, which has a fine-processing capability. Control of the depth in the duplicate can be easily performed. Since the optical information recording medium is of the surface relief type, it can be duplicated easily by, e.g., embossing, thereby realizing mass production at a low cost.

More specifically, since the diffraction grating is formed to be spatially uniform, it has a good formability in the duplicating process. Since it suffices if the diffraction grating has a uniform depth, conditions for duplication become moderate, thereby facilitating duplication.

From the foregoing, a multivalue expression of a stable (high-reliability) optical information recording medium can be realized while facilitating duplication.

In addition to the above characteristics concerning the diffracted light intensity, in the optical information recording medium of this embodiment, the second data is recorded by appropriately changing the grating pitch of the diffraction gratings constituting the cell 33 based on the second original data used for manufacturing the optical information recording medium main body. Thus, data reproduction by changing the diffraction angle of the diffracted light component can be performed, thereby enabling higher-density information recording.

In addition to the above characteristics concerning the diffracted light intensity, in the optical information recording medium of this embodiment, the third data is recorded by appropriately changing the azimuth angle of the diffraction gratings constituting the cell 34 based on the third original data used for manufacturing the optical information recording medium main body. Thus, data reproduction by changing the exit direction of the diffracted light component can be performed, thereby enabling higher-density information recording.

An information reading method for the optical information recording medium of this embodiment having the above arrangement will be described.

FIG. 13 is a schematic view showing the arrangement of an optical system for realizing an information reading method for the optical information recording medium (reflection type) of this embodiment. Only one cell on the substrate 1 will be considered.

Referring to FIG. 13, beam-like incident light 37 can be vertically incident on a substrate 31, on which a cell 35 recording data is formed, from a light source 36, e.g., a laser light beam source. A plurality of light-receiving elements 38 are circularly disposed, as shown in FIG. 13, thereby receiving diffracted light components 39 and 310 from the cell 35.

When information on the optical information recording medium is to be read, the beam-like incident light 37 from the light source 36 is caused to be vertically incident on the cell 35. When the incident light 37 is vertically incident on the cell 35, diffracted light components of ±1st order emerge with a symmetrical positional relationship.

A case will be considered wherein only +1 st-order diffracted light component 39 is detected by a light-receiving element 38 indicated as a solid element in FIG. 13 and no light is detected by other light-receiving elements 38. In this case, the grating interval and the azimuth angle of grating of the diffraction grating of a cell in question can be obtained from the position of the light-receiving element 38 indicated as the solid element. The ratio of the line width to the grating pitch of the diffraction grating of the cell can be obtained from the light intensity detected by the light-receiving element 38.

More specifically, when the grating pitch of the diffraction grating is smaller than that of the diffraction grating shown in FIG. 13, the diffracted light component is detected by a light-receiving element 38 at an outer side which is located in the same circumferential direction in accordance with the following equation.

The diffracted light component obtained by the diffraction grating is expressed by the following equation:

$$m\lambda = d(\sin \alpha + \sin \beta)$$

where $\lambda$ is the wavelength of the illumination light (incident light), $d$ is the grating pitch, $\alpha$ is the angle of incidence of the illumination light, and $\beta$ is the exit angle of mth-order diffracted light component. Usually, a diffracted light component having an m=1 st order, i.e., +1 st-order diffracted light component is considered.

When the azimuth angle of the diffraction grating is changed, the diffracted light component is detected by a light-receiving element 38 having the same distance in the direction of diameter but different position on the circumferential direction accordingly.

When the ratio of the line width to the grating pitch of the diffraction grating is changed, the light intensity of the diffracted light component detected by the light-receiving element 38 is changed accordingly.

Therefore, in the optical information recording medium of this embodiment, first to third three different types of independent pieces of information can be recorded only by a cell on which reproduction illumination light (described as incident light 7 in FIG. 13) is incident. In addition, since each of these three types of information can record binary data or data having three or more values, high-density recording can be performed.

Furthermore, when the incident light 37 is scanned or the substrate 31 is moved, large-capacity information can be read at a speed a plurality of times the conventional speed even if the scanning speed or rotating speed is the same as the conventional one.

(Third Embodiment)

FIG. 14 is a schematic view showing the state of an information reading method for an optical information recording medium on which data is recorded by changing only the line width and the grating pitch. The same portions as in FIG. 13 are denoted by the same reference numerals. Note that FIG. 14 shows a transmission type optical information recording medium.

Referring to FIG. 14, upon incidence of incident light (parallel light) 37 having a certain wavelength, cells having different grating pitches emerge diffracted light components in different directions, as in diffracted light components 311 and 312. Since ratios of the line widths to the grating pitches of the diffraction gratings are different, the light intensities of the diffracted light components 311 and 312 are also different. The diffraction angles and light intensities of the diffracted light components 311 and 312 can be obtained by detecting the diffracted light components 311 and 312 by light-receiving elements 38, and original information can be reproduced from the obtained diffraction angles and light intensities.

As described above, in the information reading method for the optical information recording medium of this embodiment, one cell causes diffracted light components to emerge in a plurality of directions simultaneously upon reception of one incident light 37. Since a plurality of data can be simultaneously reproduced, information reading at a very high speed can be realized.

The number of exit directions of the diffracted light components can be increased by increasing the spot diameter of the incident light 37 and the number of cells, so that a larger number of pieces of information can be read simultaneously.

Then, the spot diameter need not be decreased, unlike in the conventional case, and a lens system and the like for decreasing the spot diameter can be omitted or simplified.

Furthermore, when a plurality of light beams corresponding to the respective cells are incident on the cells as the incident light 37, the diffracted light component emerging from each cell is also a beam. Then, the light can be easily received by the light-receiving elements, and a read error can be eliminated.

In the above description, note that the azimuth angle of the diffraction grating indicates the angle through which the diffraction grating is pivoted about the normal to the surface of the substrate as the pivot axis, that the diffraction angle of the diffracted light component indicates the angle at which the diffracted light component emerges with respect to the normal to the surface of the substrate, and that the exit direction of the diffracted light component indicates the pivoting direction about the normal to the surface of the substrate as the pivot axis.

The gist of the third aspect of the present invention resides in the following respects. Namely, when diffraction gratings are used as the information recording elements of an optical information recording medium, the diffraction grating cell is divided into a plurality of regions, in the same diffraction grating cell, the respective regions are constituted by diffraction gratings having the same azimuth angle but different grating pitches, (a) the grating pitch of diffraction gratings constituting at least one of the respective regions is appropriately set based on the original data used for manufacturing the optical information recording medium main body, thereby recording data, or (b) the shapes and positions of the respective regions are appropriately set in units of diffraction grating cells based on the original data used for manufacturing the optical information recording medium main body, thereby recording data, or (c) the grating pitch of the diffraction gratings constituting at least one of the respective regions is appropriately set based on the first original data used for manufacturing the optical information recording medium main body, thereby recording the first data, and the shapes and positions of the respective regions are appropriately set in units of the diffraction grating cells based on the second original data used for manufacturing the optical information recording medium main body, thereby recording the second data, and thus data is recorded by using the area ratios of the respective regions or a plurality of types of grating pitches, that is, data read is enabled by realizing change in spatial distribution and in diffraction angles of the diffracted light components in the respective regions during data reproduction, thereby realizing high-density data recording.

The gist of the third aspect of the present invention also resides in that this data recording is performed independently of information recording by using the azimuth angle of the diffraction grating, and this data recording and information recording by using the azimuth angle of the diffraction grating are combined as required to record independent data, thereby realizing a further increase in density of data recording.

(Fourth Embodiment)

Figure 15:
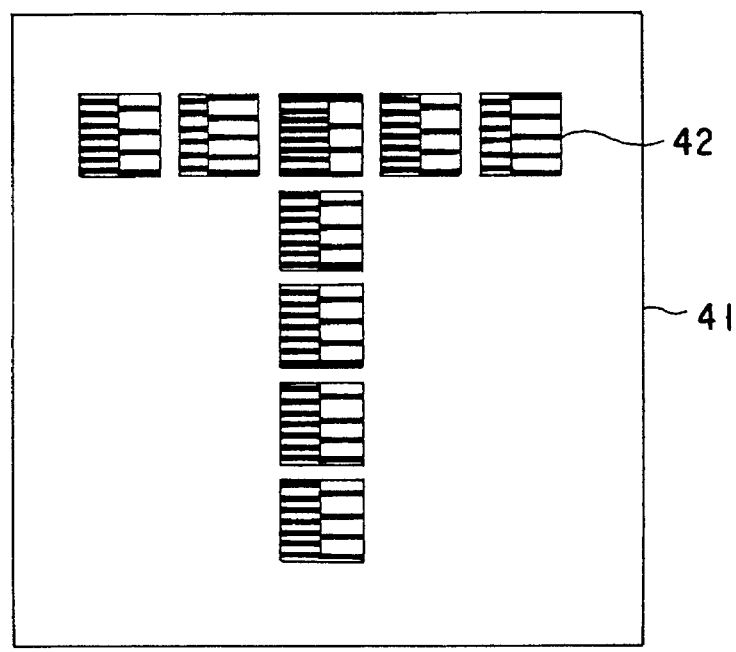
FIG. 15 is a plan view showing an optical information recording medium as the fourth embodiment according to the third aspect of the present invention.

FIG. 15 is a plan view showing the arrangement of an optical information recording medium according to this embodiment.

More specifically, as shown in FIG. 15, the optical information recording medium of this embodiment is formed by disposing, on the surface of a planar substrate 41, a plurality of cells 42 comprising small diffraction gratings through a reflecting layer (not shown).

As shown in FIG. 15, each cell 42 is divided into a plurality of (two in this embodiment) regions, in the same cell 42, the respective regions are constituted by diffraction gratings having the same azimuth angle but different grating pitches, and the grating pitch of the diffraction gratings constituting at least one of the respective regions is appropriately set based on the original data used for manufacturing the optical information recording medium main body, thereby recording data.

More specifically, the grating pitch and the area ratio of the diffraction gratings of each region are determined based on the original data used for manufacturing the optical information recording medium so as to change the diffraction angle and the intensity of the diffracted light component of the diffraction gratings of each region. In this case, the grating pitch and the area may be determined while considering the conditions for visual observation as well.

Figure 16:
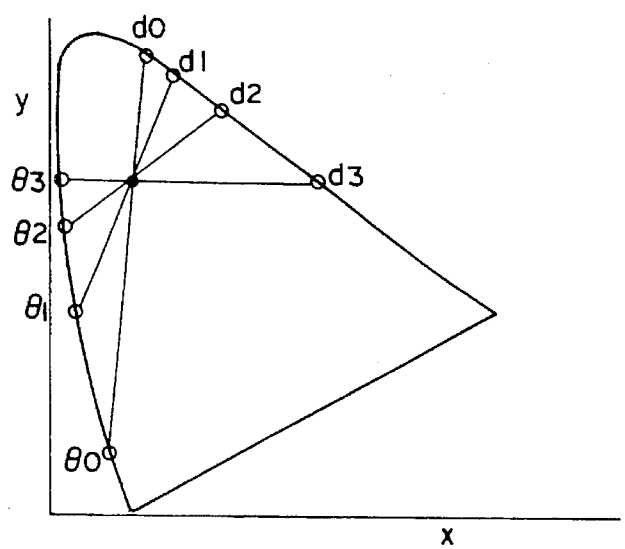
FIG. 16 is a chromaticity diagram for explaining a method of setting the grating pitch and the area ratio of the diffraction gratings of a cell applied to the optical information recording medium as the fourth embodiment.

More specifically, when, e.g., the respective cells are to be observed in the same color, as shown in FIG. 16, the grating pitch of the diffraction grating and the area of the region are set such that the ratio of the wavelength to the intensity of a diffracted light component emerging from each region of the same cell corresponds to the color of one point on a chromaticity diagram (refer to CIE, auxiliary standard observer, 1964) for each cell, that is, the grating pitches of two regions of each cell 42 are formed by the pair of the wavelengths at points on the two ends of a line segment extending through a certain point on the chromaticity diagram.

The diffraction grating used in the present invention may be formed in accordance with any method, i.e., a method of changing the light transmittance, reflectance, or phase.

An example of forming the diffraction grating by changing the light transmittance or reflectance includes a method of expressing the diffraction grating by changing the density.

An example of forming the diffraction grating by changing the phase includes a method of forming the diffraction grating with a three-dimensional pattern, and a method of forming the diffraction grating with layers of two media having different refractive indices (to form portions corresponding to the recessed and projecting portions with different media).

FIG. 11 is a sectional view showing the arrangement of a rectangular diffraction grating formed with a three-dimensional surface pattern.

As shown in FIG. 11, when the optical information recording medium of this embodiment is formed with the three-dimensional pattern, the depthwise directions can be sufficiently expressed by binary expression. Accordingly, this optical information recording medium can be manufactured also by using a binary device, e.g., an electron beam lithography system, to have a good formability in accordance with simple duplicating process without requiring depth control and the like.

Diffraction gratings may also be manufactured by recording an interference fringe on a photosensitive material for each region by utilizing coherence of laser light beam.

As shown in FIG. 17, the diffracted light component obtained by the diffraction grating is expressed by the following equation:

$$m\lambda = d(\sin\alpha + \sin\beta)$$

where $\lambda$ is the wavelength of the illumination light (incident light), $\underline{d}$ is the grating pitch, $\alpha$ is the angle of incidence of the illumination light, and $\beta$ is the exit angle of mth-order diffracted light component. Usually, a diffracted light component having an m=+1 st order, i.e., 1st-order diffracted light component is considered.

FIG. 18 is a plan view showing an example of a case wherein the optical information recording medium of this embodiment is applied to a card-like base material.

As shown in FIG. 18, since the thickness of the optical information recording medium of this embodiment can be greatly decreased, even when, e.g., this optical information recording medium is adhered to a card-like base material, no problem arises concerning the thickness.

In the optical information recording medium of this embodiment having the above arrangement, each cell is divided into two regions, in the same cell 42, the respective regions are constituted by diffraction gratings having the same azimuth angle but different grating pitches, and the grating pitch of the diffraction gratings constituting at least one of the respective regions is appropriately set based on the original data used for manufacturing the optical information recording medium main body, thereby recording data. Since data reproduction can be performed by changing the spatial distribution of the diffracted light components of the respective regions of the cell 42, information can be recorded at a very high density.

The color obtained by observation with a naked eye depends on the grating pitches and the area ratios of the diffraction gratings of the respective regions of the cells 42. When data is recorded in one cell 2 by means of the grating pitches of one region, if the grating pitches of the remaining regions and the area ratio are appropriately set, the same color can be observed.

Thus, a plurality of different data can be recorded at a portion (constituted by a plurality of cells 42 designed for the same point on the chromaticity coordinates) which is seen only as the same color by observation with a naked eye.

More specifically, since the grating pitches of two regions in each cell 42 are constituted by a pair of wavelengths at points on the two ends of a line segment extending through a certain point on the chromaticity diagram, when white light is caused to be incident on this optical information recording medium and observation with a naked eye is performed, all the cells 42 look shining in the same color. However, if light having a single wave length, e.g., a laser beam is caused to incident on this optical information recording medium and its diffraction angle is obtained, different data can be reproduced in units of cells 42. This is because light having wavelengths corresponding to the respective grating pitches emerges at a certain angle when light including all the wavelengths, i.e., white light is considered, and because light emerges at angles corresponding to the respective grating pitches when light having a single wavelength is considered (refer to the above equation). Hence, recorded data cannot be known with a naked eye.

In addition, data recording is not limited to recording in the same color, but it is also possible to form an arbitrary image, e.g., a pattern, by using a plurality of colors.

From the foregoing, the security effect can be improved by concealing information under the ordinary conditions.

Furthermore, since data recording is not related to the depth of the diffraction grating, this optical information recording medium can be manufactured by an apparatus, e.g., an electron beam lithography system capable of binary expression, which has a fine-processing capability. Control of the depth in the duplicate can be easily performed. The optical information recording medium can be duplicated easily by, e.g., embossing, thereby realizing mass production at a low cost.

An information reading method for the optical information recording medium of this embodiment having the above arrangement will be described.

FIG. 19 is a schematic view showing the arrangement of an optical system for realizing an information reading method for the optical information recording medium of this embodiment. Only one cell on the substrate 41 will be considered.

Referring to FIG. 19, beam-like incident light 47 can be vertically incident on a substrate 41, on which a cell 45 recording data is disposed, from a light source 46, e.g., a laser light beam source. A plurality of light-receiving elements 48 are circumferentially disposed, as shown in FIG. 19, thereby receiving diffracted light components 49 and 410 from the cell 45.

when information on the optical information recording medium is to be read, the beam-like incident light 47 from the light source 46 is caused to be vertically incident on the cell 45. When the incident light 47 is vertically incident on the cell 45, diffracted light components of the ±1st order emerge with a symmetrical positional relationship.

A case will be considered wherein only +1 st-order diffracted light component 49 is detected by a light-receiving element 48 indicated as a solid element in FIG. 19 and no light is detected by other light-receiving elements 48. In this case, the grating interval and the azimuth angle of grating of the diffraction grating of a cell in question can be obtained from the position of the light-receiving element 48 indicated as the solid element.

More specifically, when the grating pitch of the diffraction grating is smaller than that of the diffraction grating shown in FIG. 19, the diffracted light component is detected by a light-receiving element 48 at an outer side which is located in the same circumferential direction in accordance with the above equation.

When the azimuth angle of the diffraction grating is changed, the diffracted light component is detected by a light-receiving element 48 at a different position on the circumferential direction accordingly.

Therefore, in the optical information recording medium of this embodiment, a plurality of pieces of independent information can be recorded only by a cell on which reproducing illumination light (described as incident light 47 in FIG. 19) is incident. In addition, since each of these three types of information can record binary data or data having three or more values, high-density recording can be performed.

Furthermore, when the incident light 47 is scanned or the substrate 41 is moved, large-capacity information can be read at a speed a plurality of times the conventional speed even if the scanning speed or rotating speed is the same as the conventional one.

Since the beam-like light is caused to be incident on the cell as the incident light 47, the diffracted light components emerging from the cell also constitute a beam. Then, not only light reception by the light-receiving elements 48 becomes easy, but also a read error can be eliminated.

(Fifth Embodiment)

FIG. 20 is a plan view showing the arrangement of an optical information recording medium according to this embodiment.

More specifically, as shown in FIG. 20, the optical information recording medium of this embodiment is formed by disposing, on the surface of a planar substrate 411, a plurality of cells 412 comprising small diffraction gratings through a reflecting layer (not shown).

As shown in FIG. 20, each cell 412 is divided into a plurality of (two, three, and four in this embodiment) regions, in the same cell 412, the respective regions are constituted by diffraction gratings having the same azimuth angle but different grating pitches, and the shapes and positions of the respective regions are appropriately set in units of diffraction grating cells based on the original data used for manufacturing the optical information recording medium main body, thereby recording data.

More specifically, the grating pitch and the area ratio of the diffraction gratings of each region are determined based on the original data used for manufacturing the optical information recording medium so as to change the diffraction angle and the intensity of the diffracted light component of the diffraction gratings of each region. In this case, the grating pitch and the area may be determined while considering the conditions for visual observation as well.

More specifically, when, e.g., the respective cells are to be observed in the same color, the grating interval of the diffraction grating and the area of the region are set such that the ratio of the wavelength to the intensity of a diffracted light component emerging from each region of the same cell corresponds to the color of one point on a chromaticity diagram for each cell, that is, the grating pitches of two regions of each cell 412 are formed by the pair of the wave-lengths at points on the two ends of a line segment extending through a certain point on the chromaticity diagram.

This embodiment shows a case wherein all the cells 412 consist of diffraction gratings having common two types of grating pitches. The diffraction grating used in this embodiment may be formed in accordance with any method, i.e., a method of changing the light transmittance, reflectance, or phase.

An example of forming the diffraction grating by changing the light transmittance or reflectance includes a method of expressing the diffraction grating by changing the density.

An example of forming the diffraction grating by changing the phase includes a method of forming the diffraction grating with a three-dimensional pattern, and a method of forming the diffraction grating with layers of two media having different refractive indices (to form portions corresponding to the recessed and projecting portions with different media).

In the optical information recording medium of this embodiment having the above arrangement, each cell 412 is divided into two regions, in the same cell 412, the respective regions are constituted by diffraction gratings having the same azimuth angle but different grating pitches, and the shapes and positions of the respective regions are appropriately set in units of diffraction gratings based on the original data used for manufacturing the optical information recording medium main body, thereby recording data. Since data reproduction can be performed by changing the spatial distribution of the diffracted light components of the respective regions of the cell 412, information can be recorded at a very high density.

The color obtained by observation with a naked eye depends on the grating pitches and the area ratios of the diffraction gratings of the respective regions of the cells 412. If the area ratios of two types of diffraction gratings of the respective cells 412 are the same, these cells 412 can be observed as cells having the same color.

Thus, a plurality of different data can be recorded at a portion which is seen only as the same color by observation with a naked eye.

More specifically, since the respective regions of the respective cells 412 have two common types of diffraction gaps and the same area ratio, they correspond to a certain point on the chromaticity diagram. When white light is caused to be incident on this optical information recording medium and observation with a naked eye is performed, all the cells 412 look shining in the same color. However, if light an azimuth angle, e.g., a laser beam is caused to incident on this optical information recording medium and the spatial distribution of the diffracted light components is obtained, different data can be reproduced in units of cells 412. Hence, recorded data cannot be known with a naked eye.

In addition, data recording is not limited to recording in the same color, but it is also possible to form an arbitrary image, e.g., a pattern, by using a plurality of colors.

From the foregoing, the security effect can be improved by concealing information under the ordinary conditions.

Furthermore, since data recording is not related to the depth of the diffraction grating, this optical information recording medium can be manufactured by an apparatus, e.g., an electron beam lithography system capable of binary expression, which has a fine-processing capability. Control of the depth in the duplicate can be easily performed. The optical information recording medium can be duplicated easily by, e.g., embossing, thereby realizing mass production at a low cost.

An information reading method for the optical information recording medium of this embodiment having the above arrangement will be described.

FIG. 21(a) is a schematic view showing the arrangement of an optical system for realizing an information reading method for the optical information recording medium of this embodiment. Only one cell on the substrate 411 will be considered.

Referring to FIG. 21(a), parallel incident light 417 can be caused to be vertically incident on the substrate 411, on which a cell 415 recording data is disposed, from a light source 416, e.g., a laser light beam source. A plurality of (two in this embodiment) photodetectors 418A and 418B are disposed, as shown in FIG. 21(a), thereby receiving diffracted light components 419A and 419B from the cell 15.

when information on the optical information recording medium is to be read, the incident light 417 from the light source 416 is caused to be vertically incident on the cell 415. When the incident light 417 is vertically incident on the cell 415, two diffracted light components having different angles of diffraction emerge.

More specifically, a difference in grating pitch leads to a difference in diffraction angle, and patterns expressed by diffraction gratings having individual grating pitches are detected by the two photodetectors 418A and 418B, as shown in FIG. 21(b) (in FIG. 21(b), diffracted light components of −1 st order and the like are omitted). The photodetectors 418A and 418B are illustrated as those formed by aligning light-receiving elements, as in, e.g., CCD array.

In this case, since these patterns are inverted patterns to each other, it suffices in practice if either a photodetector 418A or 418B is provided. Then, the mechanical structure for information read access becomes simple, and easy information reading is enabled. From these points, the optical information recording medium of this embodiment can be treated in the same manner as a bar code or the like which is expressed in an ordinary printing ink.

Accordingly, in the optical information recording medium of this embodiment, a plurality of pieces of independent information can be recorded only at a cell on which reproduction illumination light (described as the incident light 417 in FIG. 21) is incident. In addition, since each of these plurality of types of information can record binary data or data having three or more values, high-density recording can be performed.

When the incident light 417 is scanned or the four substrates 11 are moved, large-capacity information can be read at a speed a plurality of times the conventional speed even if the scanning speed or rotating speed is the same as the conventional one.

when the patterns of the diffracted light components 419A and 419B respectively detected by the two photodetectors 418A and 418B are compared, whether or not the read information is valid data can be checked.

As described above, in the information reading method for the optical information recording medium of this embodiment, since one cell causes diffracted light components to emerge in a plurality of directions simultaneously upon reception of one incident light beam 47, a plurality of data can be reproduced simultaneously, thereby realizing information reading at a very high speed.

When the spot diameter of the incident light 417 and the cell are increased, a larger number of pieces of information can be read at once.

Then, the spot diameter need not be decreased, unlike in the conventional case, and a lens system and the like for decreasing the spot diameter can be omitted or simplified.

Since parallel light is caused to be incident on the cell as the incident light 417, the diffracted light components emerging from the cell also become parallel light. Then, not only light reception by the photo-detectors 418A and 418B becomes easy, but also a read error can be eliminated.

In the above description, note that the azimuth angle of the diffraction grating indicates the angle through which the diffraction grating is pivoted about the normal to the surface of the substrate as the pivot axis, that the diffraction angle of the diffracted light component indicates the angle at which the diffracted light component is emitted with respect to the normal to the surface of the substrate, and that the exit direction of the diffracted light component indicates the pivoting direction about the normal to the surface of the substrate as the pivot axis.

(Sixth Embodiment)

The above fifth embodiment and the sixth embodiment exemplify cases wherein data is recorded by using only cells in which, in the same cell, the respective regions are constituted by diffraction gratings having the same azimuth angle and different grating pitches. However, the present invention is not limited to this. When another data is recorded by changing the grating azimuth angles of the diffraction gratings of the respective regions based on another original data used for manufacturing an optical information recording medium, higher-density information recording is enabled.

FIG. 22 is a plan view showing the arrangement of a reflection type optical information recording medium according to this embodiment of this type.

More specifically, referring to FIG. 22, the optical information recording medium of this embodiment is constituted by disposing, on the surface of a planar substrate 421, a plurality of cells 422 comprising small diffraction gratings through a reflecting layer (not shown).

The diffraction gratings constituting the respective cells 422 are as shown in FIG. 22, and each cell 422 consists of diffraction gratings having two types of grating pitches.

In the cells 422 constituting the upper horizontal bar of a letter "T" in FIG. 22, the two types of grating pitches are common, and only the area ratios are different. For example, if the two types of grating pitches are set such that the wavelengths are 500 nm and 600 nm in observation, all the points on the line segments of the chromaticity diagram shown in FIG. 23 can be expressed by the area ratio of the two regions.

At this time, the ratio of p to q in FIG. 23 is equal to the area ratios of the respective regions. Accordingly, the cells 422 forming the upper horizontal bar of the letter "T" in FIG. 23 are observed in a color located at a position, on the line segment defined by the two grating pitches, of the p–q ratio equal to the area ratio.

In the cells 422 forming the vertical bar of the letter "T" shown in FIG. 23, the two types of grating pitches are common, and only the grating azimuth angles and the shapes of the respective regions are different.

when these facts are utilized, in the optical information recording medium of this embodiment, machine-reading information which cannot be recognized by visual observation can be recorded in a cell group which is seen in an arbitrary color of a range within a solid line on the chromaticity diagram in observation with a naked eye. Inversely, an image, e.g., a graphic pattern, which can be visually identified may be observed completely independently of the machine-reading information.

From the foregoing, the security effect can be further improved by concealing information under the ordinary conditions and/or by matching the visual-observation information and the machine-reading information.

In this embodiment, the number of grating pitches of the diffraction gratings of the cells and the number of divided regions are not limited to two in the same manner as in the embodiments described above.

The present invention is not limited to this embodiment, but can similarly be practiced in the following manner as well.

(a) In FIGS. 1(a) to 1(d) of the first embodiment, the number of divided regions may be a number other than the described number as far as it is plural. The dividing direction may be either vertical or horizontal especially in FIGS. 1(a) and 1(b).

(b) In FIGS. 1(c) and 1(d) of the first embodiment, the diffraction grating is not limited to a true circle but can be an ellipse.

(c) In the first embodiment, data 1 represents a case wherein diffraction gratings are present and a diffracted light component is incident on a light-receiving element. Inversely, however, data 0 may represent a case wherein diffraction gratings are present and a diffracted light component is incident on a light-receiving element, and data 1 may represent a case wherein a diffracted light component is not incident on a light-receiving element.

(d) FIGS. 1(a) and 1(b) of the first embodiment exemplify cases wherein a diffraction grating cell in which curved gratings are aligned parallel to each other to have constant or different grating pitches is used as the diffraction grating cell. However, the present invention is not limited to this. Even when a diffraction grating cell in which curved gratings, i.e., linear gratings having continuously changing gradients are aligned parallel to each other to have constant or different grating pitches is used, the same effect as that described above can be realized.

(e) The first embodiment exemplifies a case wherein a reflection type diffraction grating cell is used as the diffraction grating cell. However, the present invention is not limited to this, and a transmission type diffraction grating cell may also be employed as the diffraction grating cell. In this case, since a reflecting layer need not be provided when disposing the diffraction grating cell on the substrate, the manufacturing step of the optical information recording medium can be simplified accordingly.

(f) The first embodiment exemplifies a case wherein beam-like light is caused to be incident as incident light. However, the present invention is not limited to this.

(g) FIG. 13 of the second embodiment exemplifies a case wherein a reflection type cell is used as the cell, and FIG. 14 of the third embodiment exemplifies a case wherein a transmission type cell is used as the cell. However, the present invention is not limited to these. It is possible to use a transmission type cell as the cell in FIG. 13 of the second embodiment, and a reflection type cell as the cell in FIG. 14 of the third embodiment.

When a transmission type cell is used as the cell, a reflecting layer need not be provided when the diffraction grating cell is formed on the substrate. Therefore, the manufacturing step of the optical information recording medium can be simplified accordingly.

(h) The second and third embodiments exemplify cases wherein an optical information recording medium is formed by forming a plurality of cells comprising small diffraction gratings on the surface of a planar substrate. However, the present invention is not limited to this. The present invention can similarly be applied to a case wherein an optical information recording medium is formed by forming at least one cell on the surface of a planar substrate.

(i) The second and third embodiments exemplify cases wherein an optical information recording medium records the first to third, i.e., three types of data. However, the present invention is not limited to this. It suffices if an optical information recording medium records at least the first data.

(j) FIG. 13 of the second embodiment exemplifies a case wherein beam-like light is caused to be incident as the incident light, and FIG. 14 of the third embodiment exemplifies a case wherein parallel light is caused to be incident as the incident light. However, the present invention is not limited to these. Parallel light may be caused to be incident as the incident light in FIG. 13 of the second embodiment, and beam-like light may be caused to be incident as the incident light in FIG. 14 of the third embodiment.

(k) The second and third embodiments exemplify cases wherein the first to third, i.e., three types of data are recorded by different cells. However, the present invention is not limited to this, and these data may be recorded simultaneously by one cell.

(l) The second and third embodiments exemplify cases wherein a plurality of light-receiving elements are used. However, the present invention is not limited to this. When only the intensity of the diffracted light component is to be read, it suffices if at least one light-receiving element is provided.

(m) The fourth to sixth embodiments exemplify cases wherein a reflection type cell is used as the cell. However, the present invention is not limited, and a transmission type cell may be used as the cell. In this case, since a reflecting layer need not be provided when forming the diffraction grating cell on the substrate, the manufacturing step of the optical information recording medium can be simplified accordingly.

(n) The fourth to sixth embodiments exemplify cases wherein an optical information recording medium is formed by forming a plurality of cells comprising small diffraction gratings on the surface of a planar substrate. However, the present invention is not limited to this. The present invention can similarly be applied when an optical information recording medium is to be formed by forming at least one cell on the surface of a planar substrate.

(o) FIG. 15 of the fourth embodiment exemplifies a case wherein the cell is divided into two regions. However, the present invention is not limited to this, and three or more wavelengths may be selected to indicate a point on the chromaticity diagram. In this case, an information amount per cell can be increased.

(p) FIG. 20 of the fifth embodiment exemplifies a case wherein each of all the cells consists of diffraction gratings having two different grating pitches. However, the present invention is not limited to this. The present invention can similarly be applied to a case wherein each of all the cells consists of diffraction gratings having three or more different grating pitches.

(q) The fourth and fifth embodiments exemplify cases wherein beam-like or parallel light is caused to be incident as the incident light. However, the present invention is not limited to this.

(r) The fourth to sixth embodiments exemplify cases wherein data is recorded and read in accordance with at least one grating pitch of the respective regions of a cell or in accordance with the shapes and positions of the respective regions in a cell. However, the present invention is not limited to this, and the above data recording/reading may be performed simultaneously.

We claim:

1. An optical information recording medium characterized in that at least one cell comprising diffraction gratings is disposed on a planar substrate, and said cell is divided along two dimensions into n (n is an integer of not less than 2) regions such that each divided region represents one binary data.

2. An optical information recording medium according to claim (1), characterized in that a cell comprising diffraction gratings having at least either different azimuth angles or different grating pitches and formed in said divided regions is used as said cell.

3. An optical information recording medium according to claim (1), characterized in that a cell comprising diffraction gratings which are obtained by aligning curved gratings parallel to each other to have constant grating pitches is used as said cell.

4. An optical information recording medium according to claim (1), characterized in that a cell comprising diffraction gratings which are obtained by aligning curved gratings parallel to each other to have different grating pitches is used as said cell.

5. An optical information recording medium according to claim (1), characterized in that a cell comprising diffraction gratings which are obtained by aligning concentric circles at a predetermined gap is used as said cell, and said cell is divided into n regions by lines extending through the center of the concentric circles such that each divided region represents one binary data.

6. An optical information recording medium according to claim (1), characterized in that a cell comprising diffraction gratings which are obtained by aligning concentric circles at different gaps is used as said cell, and said cell is divided into n regions by lines extending through the center of the concentric circles such that each divided region represents one binary data.

7. An optical information recording medium according to claim 1, wherein either a reflection type cell or a transmission type cell is used as said cell.

8. A method of reading information on an optical information recording medium, comprising the steps of:

disposing at least one cell comprising diffraction gratings on a planar substrate;

dividing said at least one cell into n regions such that each of said n regions represents one binary data, n being an integer of not less than 2;

disposing light-receiving elements corresponding in number to said number n of divided regions of said cell, said light receiving elements being disposed to correspond to said divided regions; and causing an incident light beam to be incident on said cell, diffracted light components emerging from said divided regions of said cell being received by said light-receiving elements, thereby reproducing information.

9. An information reading method for an optical information recording medium according to claim (8), wherein beam-like light is caused to be incident as the incident light.

10. An optical information recording medium according to claim 1, wherein an intensity of a diffracted light component is coded based on the following equation as a ratio of the line width to the grating pitch of said diffraction gratings:

$$\eta = \left(\frac{2}{\pi}\right)^2 \sin^2\left(\frac{2\pi}{\lambda}\frac{r}{\cos\theta}\right)\sin\left(\frac{\pi}{d}l\right)^2$$

wherein $\eta$ is a diffraction efficiency (a value of 0 to 1), $\underline{r}$ is a depth of the diffraction gratings, l is the line width, $\underline{d}$ is the grating pitch, $\theta$ is an angle of incidence of reproduction illumination light, and $\lambda$ is a wavelength of the reproduction illumination light.

11. An optical information recording medium comprising:

a planar substrate;

at least one cell disposed on said planar substrate, said at least one cell having a plurality of diffraction gratings; and n regions included within said at least one cell, with each of said regions encompassing at least two of said plurality of diffraction gratings and being used to store a bit of binary data, with n being an integer equal to or greater than two.

12. An optical information recording medium according to claim 11, wherein said diffraction gratings of said at least one cell have at least one of: (i) different azimuth angles, and (ii) different grating pitches for each of said n regions.

13. An optical information recording medium according to claim 11, wherein said diffraction gratings of said at least one cell have constant grating pitches.

14. An optical information recording medium according to claim 11, wherein said diffraction gratings have different grating pitches.

15. An optical information recording medium according to claim 11, wherein said n regions are formed by extending lines through a center of concentric circles, said concentric circles being aligned at a predetermined gap.

16. An optical information recording medium according to claim 11, wherein said n regions are formed by extending lines through a center of concentric circles, said concentric circles being aligned at different gaps.

17. An optical information recording medium according to claim 11, wherein said at least one cell is a reflection type cell or a transmission type cell.

18. An optical information recording medium according to claim 11, wherein an intensity of a diffracted light component is coded based on the following equation as a ratio of line width to grating pitch of said diffraction gratings:

$$\eta = \left(\frac{2}{\pi}\right)^2 \sin^2\left(2\frac{\pi}{\lambda} \frac{r}{\cos\theta}\right) \sin\left(\frac{\pi}{d} l\right)^2$$

wherein $\eta$ is a diffraction efficiency (a value of 0 to 1), $\underline{r}$ is a depth of the diffraction gratings, l is the line width, $\underline{d}$ is the grating pitch, $\theta$ is an angle of incidence of reproduction illumination light, and $\lambda$ is a wavelength of the reproduction illumination light.

* * * * *